United States Patent
Miyauchi et al.

(10) Patent No.: US 11,671,730 B2
(45) Date of Patent: Jun. 6, 2023

(54) SOLID-STATE IMAGING DEVICE, METHOD FOR DRIVING SOLID-STATE IMAGING DEVICE, AND ELECTRONIC APPARATUS

(71) Applicant: BRILLNICS SINGAPORE PTE. LTD., Singapore (SG)

(72) Inventors: Ken Miyauchi, Tokyo (JP); Isao Takayanagi, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/749,404

(22) Filed: May 20, 2022

(65) Prior Publication Data

US 2022/0385852 A1 Dec. 1, 2022

(30) Foreign Application Priority Data

May 25, 2021 (JP) .............................. JP2021-087478

(51) Int. Cl.
| | |
|---|---|
| *H04N 25/77* | (2023.01) |
| *H04N 25/778* | (2023.01) |
| *H04N 25/46* | (2023.01) |
| *H04N 25/59* | (2023.01) |
| *H04N 25/75* | (2023.01) |

(52) U.S. Cl.
CPC ........... *H04N 25/778* (2023.01); *H04N 25/46* (2023.01); *H04N 25/59* (2023.01); *H04N 25/75* (2023.01)

(58) Field of Classification Search
None
See application file for complete search history.

(56) References Cited

U.S. PATENT DOCUMENTS

| | | | |
|---|---|---|---|
| 10,547,802 B2 | 1/2020 | Sakakibara et al. | |
| 10,791,292 B1 | 9/2020 | Geurts | |
| 2008/0266434 A1 | 10/2008 | Sugawa et al. | |
| 2018/0115730 A1* | 4/2018 | Velichko | H04N 23/667 |

* cited by examiner

*Primary Examiner* — Mark T Monk
(74) *Attorney, Agent, or Firm* — Pillsbury Winthrop Shaw Pittman LLP

(57) ABSTRACT

In a pixel 200, a floating diffusion FD11 and a first capacitor CS11 are selectively connected to each other via a first connection element LG11-Tr, to change the capacitance of the floating diffusion FD11 between a first capacitance and a second capacitance, thereby changing the conversion gain between a first conversion gain (HCG) corresponding to the first capacitance and a second conversion gain (MCG) corresponding to the second capacitance. The floating diffusion FD11 and a second capacitor CS12 are connected together through a second connection element SG11-Tr to change the capacitance of the floating diffusion FD11 to a third capacitance, thereby changing the conversion gain of the source following transistor SF11-Tr to a third conversion gain (LCG) corresponding to the third capacitance.

17 Claims, 23 Drawing Sheets

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2021-087478 (filed on May 25, 2021), the contents of which are incorporated herein.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as complementary metal oxide semiconductor (CMOS) image sensors, which have been in practical use. The CMOS image sensors have been widely applied as parts of various types of electronic apparatuses such as digital cameras, video cameras, surveillance cameras, medical endoscopes, personal computers (PCs), automotive cameras, mobile phones and other portable terminals (mobile devices).

The CMOS image sensor includes, for each pixel, a photodiode (a photoelectric conversion element) and a floating diffusion (FD) amplifier having a floating diffusion (FD). The mainstream design of the read-out operation in the CMOS image sensor is a column parallel output processing of selecting one of the rows in the pixel array and reading the pixels in the selected row simultaneously in the column output direction.

Each pixel of a general CMOS image sensor includes, for one photodiode for example, four active elements: a transfer transistor serving as a transfer element, a reset transistor serving as a reset element, a source follower transistor serving as a source follower element (an amplification element), and a selection transistor serving as a selection element.

To improve characteristics, various methods have been proposed for fabricating a CMOS image sensor that has a high dynamic range (HDR) and provides a high picture quality (see, for example, Patent Literatures 1, 2 and 3).

In the high-dynamic-range CMOS image sensor disclosed in Patent Literature 1, the pixels include photodiodes PD for generating charges in response to light incident thereon, and the charges from the photodiodes PD may be coupled with the voltage source to be discharged, or transferred to charge storage regions such as storage diodes. If the generated charges in the charge storage regions exceed a first charge level in the charge storage region, the charges may overflow into a first storage capacitor through a first transistor. If the generated charges exceed a second charge level, which is higher than the first charge level, the charges may overflow through a second transistor. The charges overflowing through the second transistor can be transferred or discharged to a second storage capacitor to be subsequently read out.

Patent Literature 2 discloses a solid-state image pickup device, a control method therefor and an electronic apparatus that are capable of realizing a broad dynamic range while reducing the influence of PLS. The solid-state image pickup device includes a pixel array unit having a plurality of pixels arranged therein. Some of the pixels in the pixel array unit are unit pixels having at least one photoelectric conversion element and an overflow storage capacitor (LOFIC). In addition, the solid-state image pickup device includes one AD converter for the one or more unit pixels in the pixel array unit.

Patent Literature 3 discloses a CMOS image sensor that can achieve a wide dynamic range while maintaining high sensitivity with a high S/N ratio. In the array of pixels, each pixel has: a photodiode PD for receiving light, generating charges through photoelectric conversion, and storing the generated charges; and a storage capacitor CS coupled with the photodiode PD through a transfer transistor Tr1 and configured to store therein the optical charges overflowing from the photodiode PD. The storage capacitor CS is configured to store the optical charges overflowing from the photodiode PD.

RELEVANT REFERENCE

List of Relevant Patent Literature

Patent Literature 1: U.S. Pat. No. 10,791,292 B1
Patent Literature 2: U.S. Pat. No. 10,547,802 B2
Patent Literature 3: US20080266434 A1

SUMMARY

As described above, CMOS image sensors (CIS) can employ various characteristic structures in pixels for achieving an improved dynamic range.

One of the approaches applied to increase the dynamic range, a lateral overflow integration capacitor (LOFIC) can be proposed. The LOFIC, however, has serious issues, or faces a reduced SNR at the conjunction (connection) point of a high conversion gain (HCG) signal and a low conversion gain (LCG) signal. More specifically, the LOFIC architecture alone can not remove kTC noise of the LCG signal, which results in a lower SNR at the conjunction point of the HCG signal and the LCG signal.

One of the methods to minimize the degradation of the SNR is to use triple-conversion-gain read-out involving dual-conversion-gain read-out, the LOFIC architecture, and dividing of pixels (split pixels).

Such a pixel configuration (dividing of pixels), however, encounters some issues from the optical perspective. The issues include, for example, an optical structure between a large photodiode PD and a small photodiode PD, different angular responses and different quantum efficiencies (Q.E.), or responsiveness between a large photodiode PD and a small photodiode PD.

The present invention is designed to provide a solid-state imaging device, a method for driving a solid-state imaging device, and an electronic apparatus that are capable of preventing degradation of the SNR at a conjunction point of signals produced with different conversion gains while avoiding being affected by the optical specifications.

A first aspect of the present invention provides a solid-state imaging device including a pixel configured to perform photoelectric conversion, where the pixel is configured to produce readable signals corresponding to at least three conversion gains. The pixel has: a floating diffusion configured to hold charges transferred thereto so that the charges are read out as a voltage signal, where the floating diffusion is configured to convert the charges into voltage determined by a capacitance; a photoelectric conversion element configured to store therein, in an exposure period, charges corresponding to an amount of incident light; a transfer element configured to remain in a non-conduction state during the exposure period and to remain in a conduction state during a transfer period to transfer to the floating diffusion the charges stored in the photoelectric conversion element; a reset element configured to perform a reset operation of discharging the charges stored at least in the floating diffusion; a first capacitance element configured to be connected to or disconnected from the floating diffusion according to a conversion gain; a first connection element configured to selectively connect together the floating diffusion and the first capacitance element; a second capacitance element configured to store overflow charges overflowing from the photoelectric conversion element; a second connection element configured to selectively connect together the floating diffusion and the second capacitance element; an overflow path configured to allow charges overflowing from the photoelectric conversion element to overflow toward a region where the second capacitance element is formed; an overflow gate element formed on the overflow path to control conduction through the overflow path; and a source follower element for amplifying a voltage signal produced by conversion performed by the floating diffusion and outputting the amplified voltage signal.

A second aspect of the present invention provides a method for driving a solid-state imaging device including a pixel configured to perform photoelectric conversion, where the pixel is configured to produce readable signals corresponding to at least three conversion gains. The pixel has: a floating diffusion configured to hold charges transferred thereto so that the charges are read out as a voltage signal, where the floating diffusion is configured to convert the charges into voltage determined by a capacitance; a photoelectric conversion element configured to store therein, in an exposure period, charges corresponding to an amount of incident light; a transfer element configured to remain in a non-conduction state during the exposure period and to remain in a conduction state during a transfer period to transfer to the floating diffusion the charges stored in the photoelectric conversion element; a reset element configured to perform a reset operation of discharging the charges stored at least in the floating diffusion; a first capacitance element configured to be connected to or disconnected from the floating diffusion according to a conversion gain; a first connection element configured to selectively connect together the floating diffusion and the first capacitance element; a second capacitance element configured to store overflow charges overflowing from the photoelectric conversion element; a second connection element configured to selectively connect together the floating diffusion and the second capacitance element; an overflow path configured to allow charges overflowing from the photoelectric conversion element to overflow toward a region where the second capacitance element is formed; an overflow gate element formed on the overflow path to control conduction through the overflow path; and a source follower element for amplifying a voltage signal produced by conversion performed by the floating diffusion and outputting the amplified voltage signal. By selectively connecting together the floating diffusion and the first capacitance element via the first connection element, a capacitance of the floating diffusion is changed between a first capacitance and a second capacitance to change a conversion gain between a first conversion gain corresponding to the first capacitance and a second conversion gain corresponding to the second capacitance, and, by connecting together the floating diffusion and the first capacitance element via the first connection element, and connecting the floating diffusion and the second capacitance element via the second connection element, the capacitance of the floating diffusion is changed to a third capacitance to change the conversion gain of the floating diffusion to a third conversion gain corresponding to the third capacitance.

A third aspect of the present invention provides an electronic apparatus including a solid-state imaging device, and an optical system for forming a subject image on the solid-state imaging device. The solid-state imaging device includes a pixel configured to perform photoelectric conversion, where the pixel is configured to produce readable signals corresponding to at least three conversion gains. The pixel has: a floating diffusion configured to hold charges transferred thereto so that the charges are read out as a voltage signal, where the floating diffusion is configured to convert the charges into voltage determined by a capacitance; a photoelectric conversion element configured to store therein, in an exposure period, charges corresponding to an amount of incident light; a transfer element configured to remain in a non-conduction state during the exposure period and to remain in a conduction state during a transfer period to transfer to the floating diffusion the charges stored in the photoelectric conversion element; a reset element configured to perform a reset operation of discharging the charges stored at least in the floating diffusion; a first capacitance element configured to be connected to or disconnected from the floating diffusion according to a conversion gain; a first connection element configured to selectively connect together the floating diffusion and the first capacitance element; a second capacitance element configured to store overflow charges overflowing from the photoelectric conversion element; a second connection element configured to selectively connect together the floating diffusion and the second capacitance element; an overflow path configured to allow charges overflowing from the photoelectric conversion element to overflow toward a region where the second capacitance element is formed; an overflow gate element formed on the overflow path to control conduction through the overflow path; and a source follower element for amplifying a voltage signal produced by conversion performed by the floating diffusion and outputting the amplified voltage signal.

Advantageous Effects

The present invention can prevent degradation of the SNR at a conjunction point of signals produced with different conversion gains while avoiding being affected by the optical specifications.

DESCRIPTION OF THE PREFERRED EMBODIMENTS

Embodiments of the present invention will be hereinafter described with reference to the drawings.

First Embodiment

Figure 1:
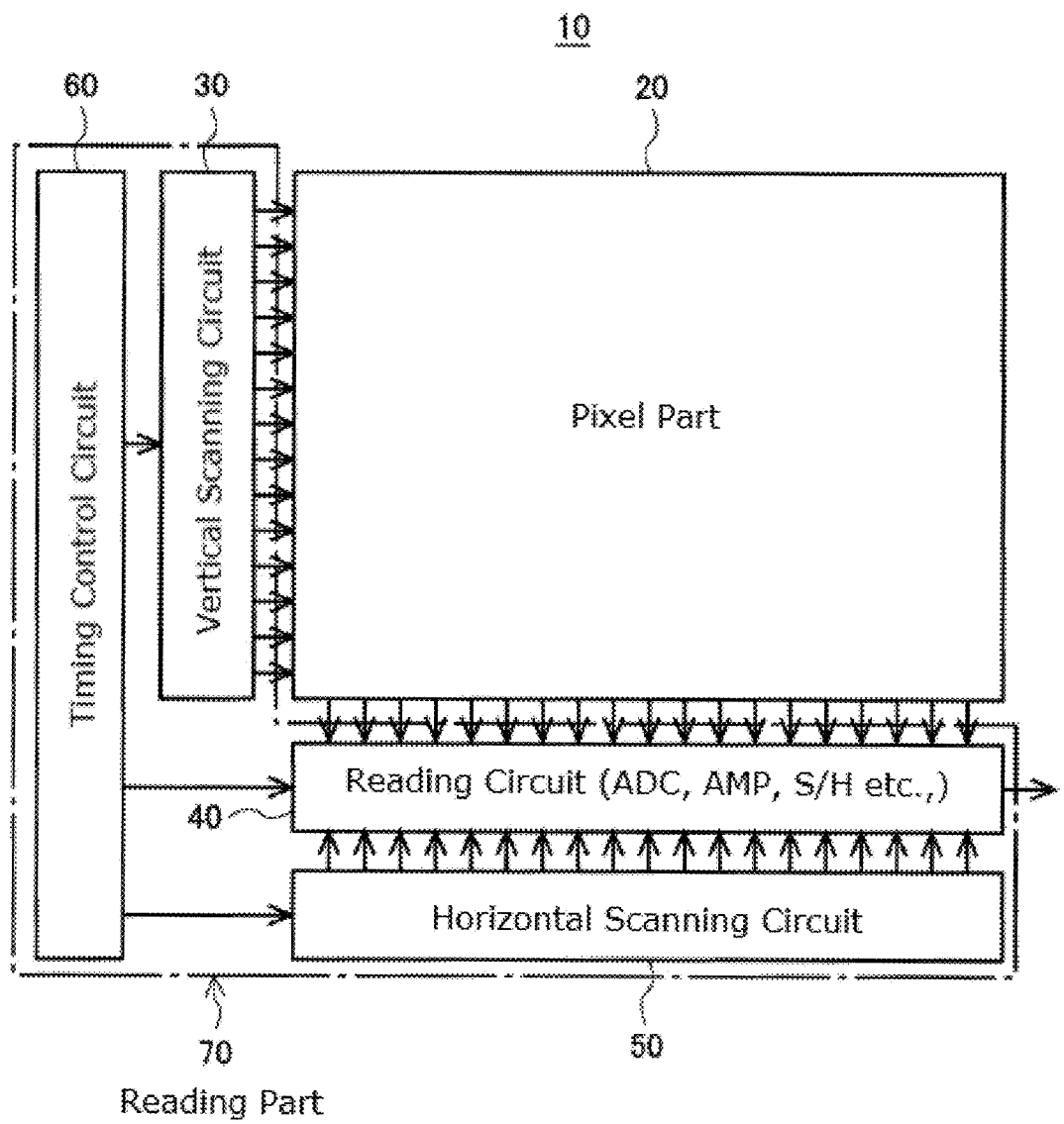
FIG. 1 is a block diagram showing an example configuration of a solid-state imaging device according to a first embodiment of the present invention.
Figure 2:
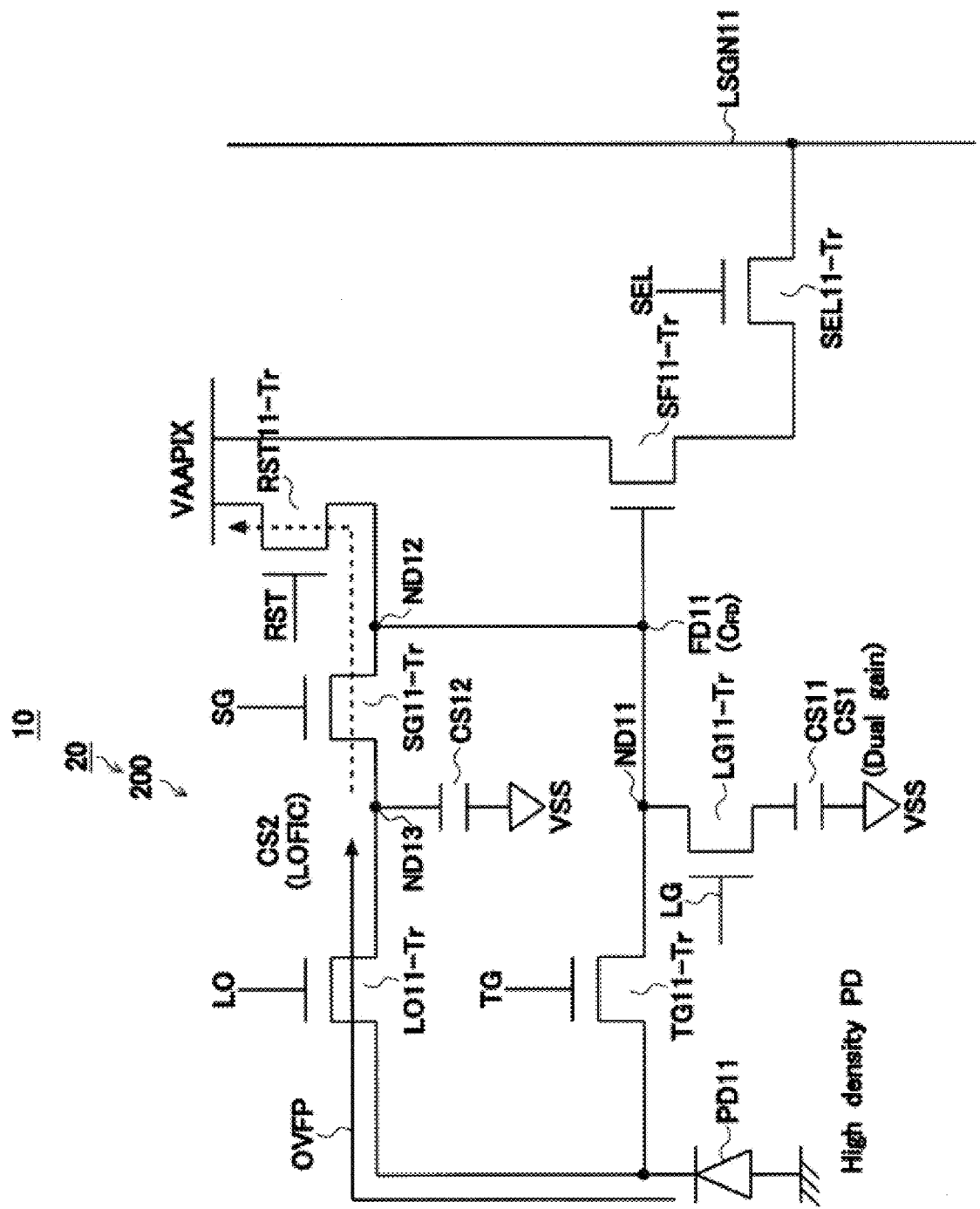
FIG. 2 is a circuit diagram showing an example configuration of a pixel of the solid-state imaging device relating to the first embodiment of the present invention.
Figure 3A:
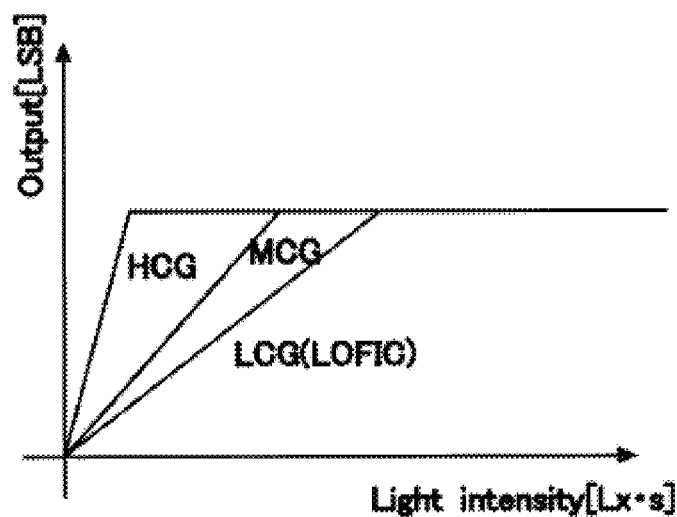
FIGS. 3A and 3B are used to illustrate photoelectric conversion characteristics relating to triple-conversion-gain read-out performed in the solid-state imaging device relating to the first embodiment of the present invention.
Figure 3B:
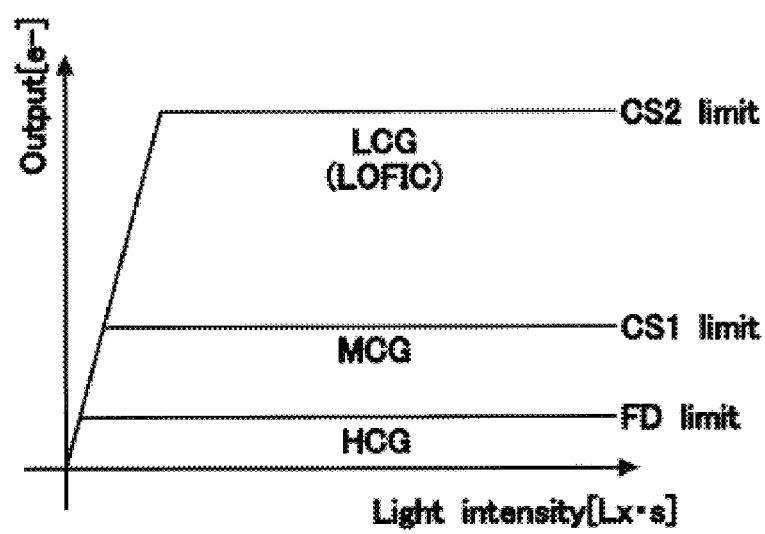

FIG. 1 is a block diagram showing an example configuration of a solid-state imaging device relating to a first embodiment of the present invention. FIG. 2 is a circuit diagram showing an example configuration of a pixel of the solid-state imaging device relating to the first embodiment of the present invention. FIGS. 3A and 3B are used to illustrate the conversion gain and capacitance relating to triple-conversion-gain reading performed in the solid-state imaging device relating to the first embodiment of the present invention. In this embodiment, a solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, and a timing control circuit 60. Among these components, for example, the vertical scanning circuit 30, the reading circuit 40, the horizontal scanning circuit 50, and the timing control circuit 60 constitute the reading part 70 for reading out pixel signals.

In the solid-state imaging device 10 relating to the first embodiment, as will be described in detail below, pixels 200 are arranged in a matrix pattern in the pixel part 20, and each pixel 200 is basically configured as shown in FIG. 2. The pixel 200 includes: a floating diffusion FD 11 storing therein the to-be-transferred charges so that the charge can be read in the form of a voltage signal; a photodiode PD11 serving as a photoelectric conversion element for storing, in an exposure period PEXP, therein the charges determined by the amount of incident light; a transfer transistor TG11-Tr serving as a transfer element for transferring to the floating diffusion FD11 the charges stored in the photodiode PD11 serving as the photoelectric conversion element, where the transfer transistor TG11-Tr remains in a non-conduction state during the exposure period PEXP and remains in a conduction state during a transfer period; and a reset transistor RST11-Tr serving as a reset element for performing a reset operation of discharging the charges stored in the floating diffusion FD11.

The pixel 200 further includes: a first capacitor CS11 serving as a first capacitance element to be connected to or disconnected from the floating diffusion FD11 depending on a conversion gain; a first switching transistor LG11-Tr serving as a first connection element to selectively connect the floating diffusion FD11 and the first capacitor CS11 serving as the first capacitance element; a second capacitor CS12 serving as a second capacitance element for storing therein overflow charges overflowing from the photodiode PD11 serving as the photoelectric conversion element; and a second switching transistor SG11-Tr serving as a second connection element to selectively connect the floating diffusion FD11 and the second capacitor CS12 serving as the second capacitance element.

The pixel 200 further includes: an overflow path OVFP for allowing the charges overflowing from the photodiode PD11 serving as the photoelectric conversion element to overflow toward the region where the second capacitor CS2 serving as the second capacitance element is formed; an overflow path transistor LO11-Tr serving as an overflow gate element formed on the overflow path OVFP, where the overflow path transistor LO11-Tr is configured to control the conduction through the overflow path OVFP; a source follower transistor SF11-Tr serving as a source follower element for outputting a voltage signal produced by the floating diffusion FD11 through conversion; and a selection transistor SEL11-Tr serving as a selection element.

The pixel 200 relating to the present embodiment is configured to, under control of the reading part 70, change the capacitance of the floating diffusion FD11 between a first capacitance and a second capacitance to change the conversion gain between a first conversion gain (for example, high conversion gain: HCG) corresponding to the first capacitance and a second conversion gain (for example, middle conversion gain: MCG) corresponding to the second capacitance, by selectively connecting the floating diffusion FD11 to the first capacitor CS11 serving as the first capacitance element through the first switching transistor LG11-Tr serving as the first connection element. The pixel 200 is further configured to, under control of the reading part 70, change the capacitance of the floating diffusion FD11 to a third capacitance to change the conversion gain to a third conversion gain (for example, low conversion gain: LCG) corresponding to the third capacitance, by connecting the floating diffusion FD11 to the second capacitor CS12 serving as the second capacitance element through the second switching transistor SG11-Tr serving as the second connection element.

The pixel 200 is configured to perform, under control of the reading part 70, first-conversion-gain mode read-out and second-conversion-gain mode read-out in a designated dual-conversion-gain read-out mode period as shown in FIGS. 3A and 3B. In the first-conversion-gain mode reading, pixel signals are read with the first conversion gain (high conversion gain (HCG)) corresponding to the first capacitance, and in the second-conversion-gain mode reading, pixel signals are read with the second conversion gain (middle conversion gain: MCG) corresponding to the second capacitance (different from the first capacitance). The pixel 200 is further configured to perform, under control of the reading part 70, third-conversion-gain mode reading to read pixel signals with the third conversion gain (low conversion gain (LCG)) corresponding to the third capacitance in an overflow read-out mode (LOFIC read-out mode) period relating to the overflow charges, which follows the dual-conversion-gain read-out mode period.

The pixel 200 has, for example, a lateral overflow integration capacitor (LOFIC), so that a dual-sampling read-out mode (LOFIC mode) operation can be performed in a low illuminance circumstance under control of the reading part 70. In the LOFIC mode operation, the third conversion gain (single gain) is used for the charges stored in the photodiode PD11 serving as the photoelectric conversion element and the overflow charges.

As described above, the pixel 200 relating to the first embodiment can minimize degradation in the SNR by employing the triple-conversion-gain read-out, without employing the pixel dividing technique. According to the triple-conversion-gain read-out, the pixel signals are read from the pixels 200 with the first conversion gain (for example, high conversion gain: HCG) corresponding to the first capacitance in the first-conversion-gain mode read-out, with the second conversion gain (for example, the middle conversion gain: MCG) corresponding to the second capacitance (different from the first capacitance) in the second-conversion-gain mode read-out, and with the third conversion gain (for example, the low conversion gain: LCG) corresponding to the third capacitance in the third-conversion-gain mode read-out, as shown in FIG. 3.

<Specific Circuit Configuration of Pixel 200>

The following now specifically describes the circuit configuration of the pixel 200 shown in FIG. 2. The pixel 200 described below has an LOFIC configuration, for example.

In the pixel part 20, the pixels 200 each including a photodiode (photoelectric converting element) and an in-pixel amplifier are arranged in a two-dimensional matrix comprised of N rows and M columns.

The pixel 200 includes, for example as shown in FIG. 2,: the photodiode PD11 serving as the photoelectric conversion element; the transfer transistor TG11-Tr serving as the transfer element; the reset transistor RST11-Tr serving as the reset element; the source follower transistor SF11-Tr serving as the source follower element; the selection transistor SEL11-Tr serving as the selection element; the first switching transistor LG11-Tr serving as the first connection element; the second switching transistor SG11-Tr serving as the second connection element; the overflow path transistor LO11-Tr serving as the overflow gate element; the first capacitor CS11 serving as the first capacitance element; the second capacitor CS12 serving as the second capacitance element; the floating diffusion FD11; first and second nodes ND11 and ND12 connected to the floating diffusion FD11; and a third node ND13 connected to the second capacitor CS12.

In the first embodiment, the photodiode PD11 of the pixel 200 is a high-capacitance photodiode. In the pixel 200, the capacitances of the floating diffusion FD11, the first capacitor CS11, and the second capacitor CS12 are set as follows (see also FIG. 3B). The capacitance CFD of the floating diffusion FD11 is very small for achieving a high gain and a low noise. The capacitance CS1 of the first capacitor CS11 is greater than the capacitance of the high-capacitance photodiode PD11 or a middle capacitance for the purpose of minimizing degradation of the SNR. The capacitance CS2 of the second capacitor CS12 is very large (electrostatic capacitance) for achieving a high full well capacity (FWC). The capacitance CS2 of the second capacitor CS12 is greater than the capacitance CS1 of the first capacitor CS11 and the capacitance CFD of the floating diffusion FD11. The capacitance CS1 of the first capacitor CS11 is mainly used for achieving the middle conversion gain, and the capacitance CS2 of the second capacitor CS12 is additionally used for achieving the low conversion gain.

The high-capacitance photodiode PD11 generates signal charges (electrons) in an amount determined by the quantity of the incident light and stores the generated signal charges. A description will be hereinafter given of a case where the signal charges are electrons and each transistor is an n-type transistor. However, it is also possible that the signal charges are holes or each transistor is a p-type transistor.

The photodiode (PD) in each pixel 200 is a pinned photodiode (PPD). On a substrate surface for forming the photodiodes (PDs), there is a surface level due to dangling bonds or other defects, and therefore, a lot of charges (dark current) are generated due to heat energy, so that signals fail to be read out correctly. In the case of a pinned photodiode (PPD), a charge storage part of the photodiode (PD) is buried in the substrate to reduce mixing of the dark current into signals.

The transfer transistor TG11-Tr is connected between the photodiode PD11 and the floating diffusion FD11 (and the first node ND11) and controlled through a control signal TG. The transfer transistor TG11-Tr remains selected and in the conduction state in a period in which the control signal TG is at the high (H) level to transfer to the floating diffusion FD11 the charges (electrons) produced by photoelectric conversion in the photodiode PD11 and then stored in a storage node.

In the example shown in FIG. 2, the reset transistor RST11-Tr is connected between (i) a power supply potential VAAPIX and (ii) the first switching transistor LG11-Tr and the second switching transistor SG11-Tr connected to the floating diffusion FD11 respectively via the first node ND11 and the second node ND12. The reset transistor RST11-Tr is controlled through a control signal RST. The reset transistor RST11-Tr remains selected and in the conduction state during a period in which the control signal RST is at the H level, to reset at least the floating diffusion FD11 to the power supply potential VAAPIX.

In the first embodiment, the reset transistor RST11-Tr and the transfer transistor TG11-Tr are controlled to remain in the conduction state, to reset the floating diffusion FD11 and the photodiode PD11.

The first switching transistor LG11-Tr is connected between the first capacitor CS11 and the floating diffusion FD11 via the first node ND11. The first switching transistor LG11-Tr is controlled by a control signal LG applied to the gate thereof through a control line. The first switching transistor LG11-Tr remains selected and in the conduction state in a period in which the control signal LG is at the H level to connect between the floating diffusion FD11 and the first capacitor CS11. In the first embodiment, the reset transistor RST11-Tr and the first switching transistor LG11-Tr are controlled to remain in the conduction state, to reset the floating diffusion FD11 and the first capacitor CS11.

The second switching transistor SG11-Tr is connected between the second capacitor CS12 and the floating diffusion FD11 (and the reset transistor RST11-Tr) via the second node ND12. The second switching transistor SG11-Tr is controlled by a control signal SG applied to the gate thereof through a control line. The second switching transistor SG11-Tr remains selected and in the conduction state in a period in which the control signal SG is at the H level, to connect between the floating diffusion FD11 (and the reset transistor RST11-Tr) and the second capacitor CS12. In the first embodiment, the reset transistor RST11-Tr and the second switching transistor SG11-Tr are controlled to remain in the conduction state, to reset the floating diffusion FD11 and the second capacitor CS12.

The overflow path transistor LO11-Tr is connected between the charge storage node of photodiode PD11 and the second capacitor CS12 via the third node ND13. The overflow path transistor LO11-Tr is controlled by a control signal LO applied to the gate thereof through a control line. The overflow path transistor LO11-Tr remains selected and in the conduction state in a period in which the control signal LO is at the H level, to connect the charge storage node of photodiode PD11 and the second capacitor CS12.

In the first embodiment, the overflow path OVFP is formed, as shown in FIG. 2, such that the overflow charges from the photodiode PD11 can overflow into the second capacitor CS12 through the overflow path transistor LO11-Tr and the third node ND13 (the solid arrow) and the overflow charges from the second capacitor CS12 can be discharged to the power supply potential VAAPIX through the second switching transistor SG11-Tr, the second node ND12, and the reset transistor RST11-Tr (the dotted arrow).

The source follower transistor SF11-Tr and the selection transistor SEL11-Tr are connected in series between the power supply potential VAAPIX and the vertical signal line LSGN11. The gate of the source follower transistor SF11-Tr is connected to the floating diffusion FD11, and the selection transistor SEL-Tr is controlled by a control signal SEL applied to the gate thereof through a control line. The selection transistor SEL11-Tr remains selected and in the conduction state during a selection period in which the control signal SEL is at the H level. In this way, the source follower transistor SF11-Tr outputs, to the vertical signal line LSGN11, a voltage signal (VRST1, VSIG1) generated through conversion performed by the floating diffusion FD11.

Since the pixel part 20 includes the pixel circuits 200 arranged in N rows and M columns, N control lines are provided for each control signal, and M vertical signal lines are provided. In FIG. 1, the control lines for each row are represented as one row-scanning control line.

The vertical scanning circuit 30 drives the pixels in shutter and read-out rows through the row-scanning control lines under the control of the timing control circuit 60. Further, the vertical scanning circuit 30 outputs, according to address signals, row selection signals for row addresses of the reading rows from which signals are read out and the shutter rows in which the charges stored in the photodiodes PD11 are reset.

The reading circuit 40 includes a plurality of column signal processing circuits (not shown) arranged corresponding to the column outputs of the pixel part 20, and the reading circuit 40 may be configured such that the plurality of column signal processing circuits can perform column parallel processing.

The horizontal scanning circuit 50 scans the signals processed in the plurality of column signal processing circuits of the reading circuit 40, transfers the signals in a horizontal direction, and outputs the signals to a signal processing circuit (not shown).

The timing control circuit 60 generates timing signals required for signal processing in the pixel part 20, the vertical scanning circuit 30, the reading circuit 40, the horizontal scanning circuit 50, and the like.

When a dual-conversion-gain read-out mode MDCG is designated, the reading part 70 performs a second-conversion-gain reset read-out operation MCGRRD, a first-conversion-gain reset read-out operation HCGRRD, a first-conversion-gain read-out operation HCGSRD, and a second-conversion-gain read-out operation MCGSRD. When an overflow read-out mode MOVF (MLOFIC) relating to the overflow charges is designated, the reading part 70 performs a third-conversion-gain read-out operation LCGSRD and a third-conversion-gain reset read-out operation LCGRRD.

In the first embodiment, the reading part 70 performs a read-out sequence control such that, after an exposure period PEXP starts, a read-out operation is performed first in the dual-conversion-gain read-out mode MDCG and subsequently in the overflow read-out mode MOVF (MLOFIC).

For example, the reading part 70 controls the reset transistor RST11-Tr, the first switching transistor LG11-Tr, the second switching transistor SG11-Tr and the transfer transistor TG11-Tr to remain in the conduction state for a predetermined period of time, so that the photodiode PD11, the floating diffusion FD11, the first capacitor CS11 and the second capacitor CS12 are reset to perform a shutter operation, and then controls the transfer transistor TG11-Tr to remain in the non-conduction state to start the exposure period PEXP. After the exposure period PEXP starts, the reading part 70 performs operations in the dual-conversion-gain read-out mode DMCG, specifically, sequentially performs a second-conversion-gain reset read-out operation MCGRRD, a first-conversion-gain reset read-out operation HCGRRD, a first-conversion-gain signal read-out operation HCGSRD, and a second-conversion-gain signal read-out operation MCGSRD. Subsequently, the reading part 70 performs operations in the overflow read-out mode relating to the overflow charges, specifically, performs a third-conversion-gain signal read-out operation LCGSRD. Following this, the reading part 70 controls the reset transistor RST11-Tr, the first switching transistor LG11-Tr and the second switching transistor SG11-Tr to remain in the conduction state for a predetermined period of time, so that all of the charges in the floating diffusion FD11, the first capacitor CS11 and the second capacitor CS12 are discharged to the power supply potential VAAPIX to perform a shutter operation, and then performs a third-conversion-gain reset read-out operation LCGRRD.

The following now describes, as an example, a sequence of read-out operations performed on the pixel 200 in the solid-state imaging device relating to the first embodiment.

Figure 4:
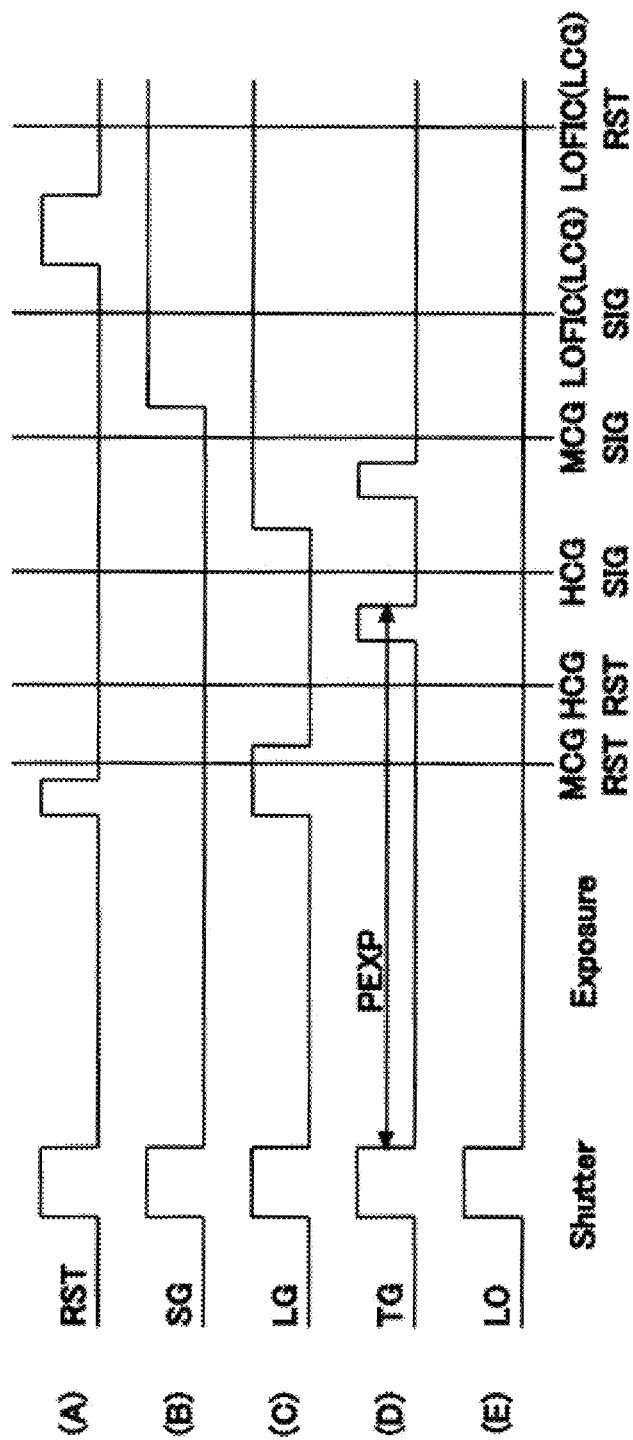
FIG. 4 is a timing chart to illustrate, as an example, a sequence of operations performed in a dual-conversion-gain read-out mode and an overflow read-out mode to read the pixels in the solid-state imaging device relating to the first embodiment of the present invention.
Figure 5:
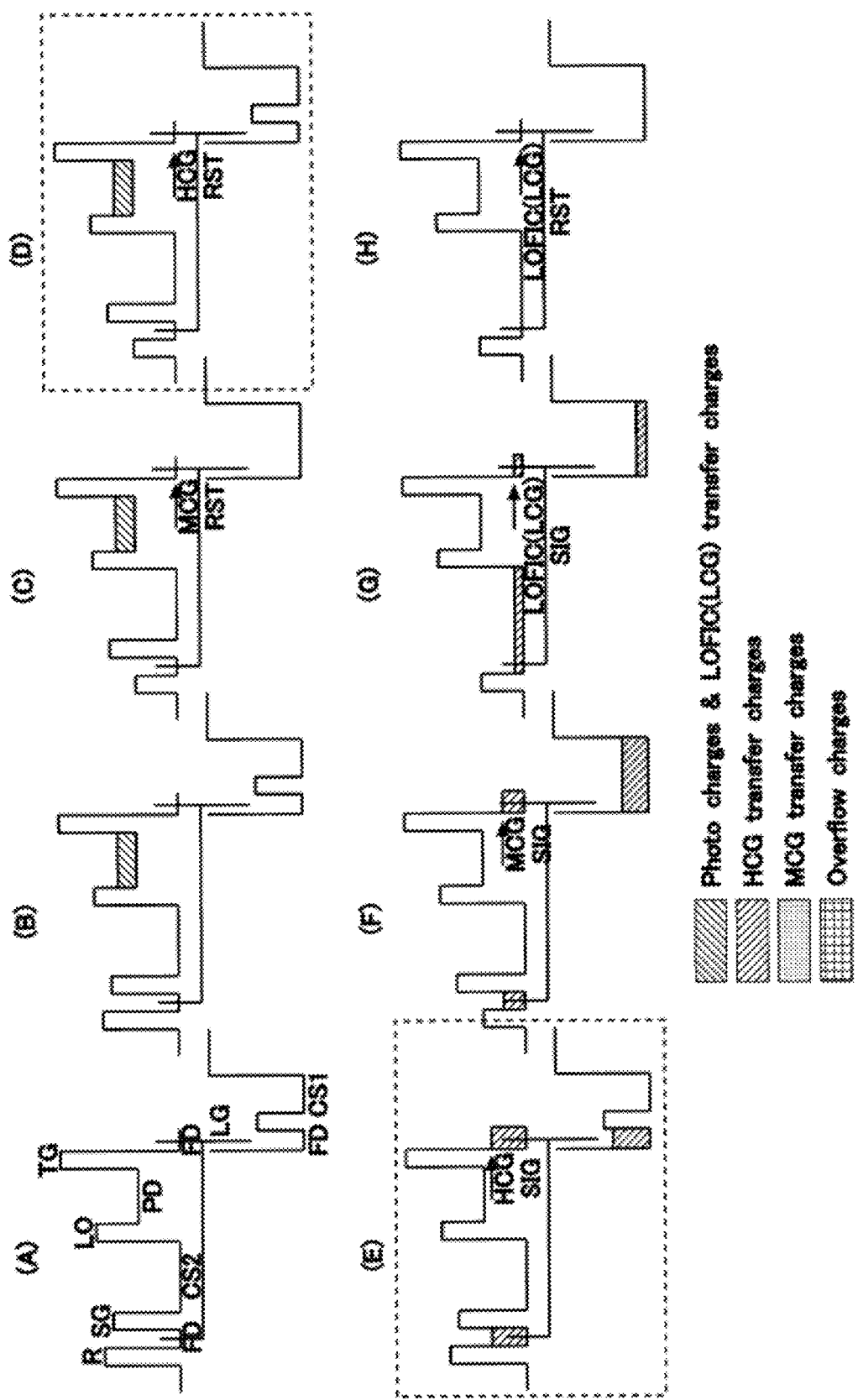
FIG. 5 includes views (A) to (H) illustrating a sequence of operations and potential transition to explain an operation performed in a dual-conversion-gain read-out mode and an overflow read-out mode on the pixels of the solid-state imaging device relating to the first embodiment of the present invention in a low illuminance circumstance.
Figure 6:
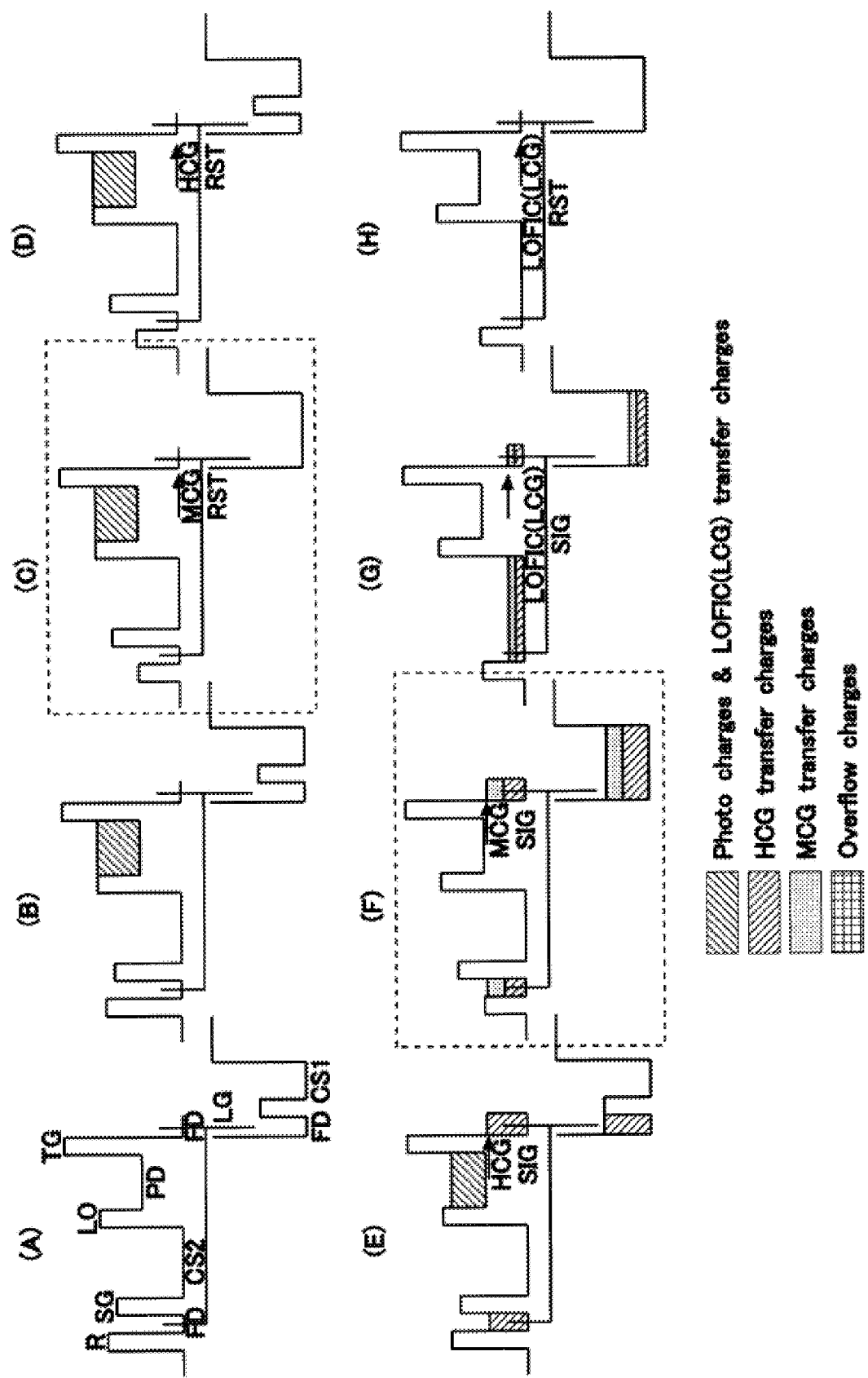
FIG. 6 includes views (A) to (H) illustrating a sequence of operations and potential transition to explain an operation performed in a dual-conversion-gain read-out mode and an overflow read-out mode on the pixels of the solid-state imaging device relating to the first embodiment of the present invention in a medium illuminance circumstance.
Figure 7:
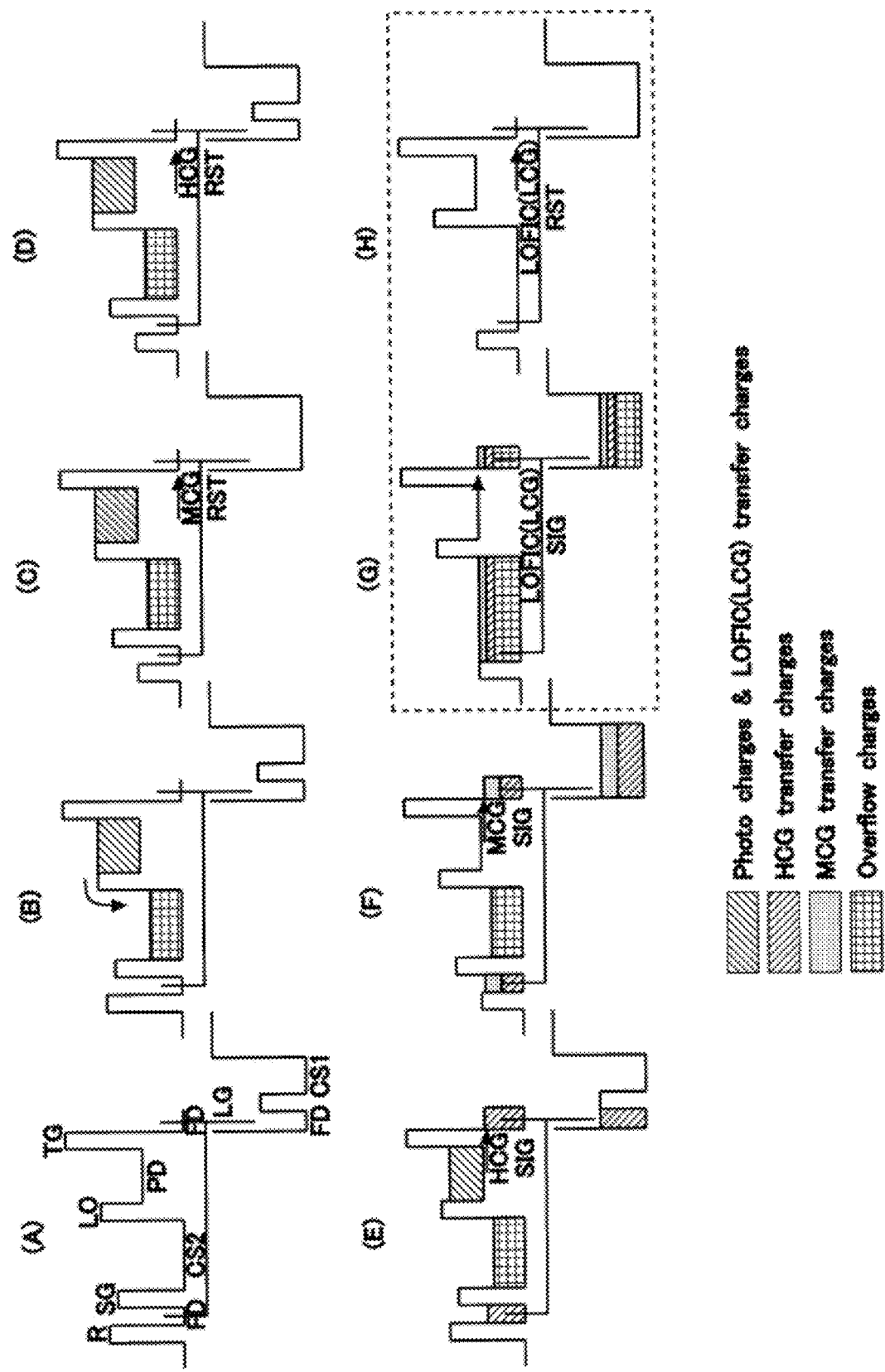
FIG. 7 includes views (A) to (H) illustrating a sequence of operations and potential transition to explain an operation performed in a dual-conversion-gain read-out mode and an overflow read-out mode on the pixels of the solid-state imaging device relating to the first embodiment of the present invention in a high illuminance circumstance.

FIG. 4 is a timing chart, including parts (A) to (E), to illustrate, as an example, a sequence of read-out operations performed in the dual-conversion-gain read-out mode and the overflow read-out mode on the pixels in the solid-state imaging device relating to the first embodiment of the present invention. FIG. 5 includes views (A) to (H) illustrating a sequence of operations and potential transition to explain the operations performed in the dual-conversion-gain read-out mode and an overflow read-out mode on the pixels of the solid-state imaging device relating to the first embodiment of the present invention in a low illuminance circumstance. FIG. 6 includes views (A) to (H) illustrating a sequence of operations and potential transition to explain the operations performed in the dual-conversion-gain read-out mode and the overflow read-out mode on the pixels of the solid-state imaging device relating to the first embodiment of the present invention in a medium illuminance circumstance. FIG. 7 includes views (A) to (H) illustrating a sequence of operations and potential transition to explain the operations performed in the dual-conversion-gain read-out mode and the overflow read-out mode on the pixels of the solid-state imaging device relating to the first embodiment of the present invention in a high illuminance circumstance.

In FIG. 4, the part (A) shows the control signal RST for the reset transistor RST11-Tr, the part (B) shows the control signal SG for the second switching transistor SG11-Tr, the part (C) shows the control signal LG for the first switching transistor LG11-Tr, the part (D) shows the control signal TG for the transfer transistor TG11-Tr, and the part (E) shows the control signal LO for the overflow path transistor LO11-Tr.

The sequence of read-out operations performed on the pixels in the dual-conversion-gain read-out mode and the overflow read-out mode proceeds in the same manner in low, medium and high illuminance circumstances, as will be described below.

Before the operations in the dual-conversion-gain read-out mode MDCG start, the control signals RST, SG, LG, TG and LO remain at the high level for a predetermined period of time, to keep the reset transistor RST11-Tr, the second switching transistor SG11-Tr, the first switching transistor LG11-Tr, the transfer transistor TG11-Tr and the overflow path transistor LO11-Tr in the conduction state for a predetermined period of time. This resets the photodiode PD11, the floating diffusion FD11, the first capacitor CS11, and the second capacitor CS12 to the fixed potential VAAPIX. In other words, a shutter operation is performed (the parts (A)-(E) in FIG. 4).

At the timing when the transfer transistor TG11-Tr is switched from the conduction state to the non-conduction state, the exposure period PEXP starts (the part (D) in FIG. 4). After the exposure period PEXP ends, the control signals RST and LG are switched to the high level at the beginning of the read-out period, to place the reset transistor RST11-Tr and the first switching transistor LG11-Tr into the conduction state. This resets the floating diffusion FD11 and the first capacitor CS11. After a predetermined period of time has elapsed since the control signals RST and LG are switched to the high level, only the control signal RST is switched to the low level to switch the reset transistor RST11-Tr into the non-conduction state. In this way, a first reset signal read-out period begins. Since the control signal LG remains at the high level to keep the first switching transistor LG11-Tr in the conduction state, the charges in the floating diffusion FD11 and the charges in the first capacitor CS11 are combined, so that the gain of the floating diffusion FD11 is switched to the second conversion gain MCG corresponding to the second capacitance including the capacitance CFD of the floating diffusion FD11 and the capacitance CS1 of the first capacitor CS11.

In the first reset signal read-out period following the resetting, the second-conversion-gain reset read-out operation MCGRRD is performed. More specifically, a second read-out reset signal MCGRST (ADC), which is produced by conversion with the second conversion gain MCG corresponding to the second capacitance of the floating diffusion FD11, is read from the source follower transistor SF11-Tr and subject to a predetermined operation.

After the first reset signal read-out period has elapsed, the control signal LG is switched to the low level to switch the first switching transistor LG11-Tr into the non-conduction state. In this way, a second reset signal read-out period begins. The first capacitor CS11 is disconnected from the floating diffusion FD11, so that the charges in the floating diffusion FD11 are separated from the charges in the first capacitor CS11. In this way, the gain of the floating diffusion FD11 (source follower transistor SF11-Tr) is switched to the first conversion gain HCG corresponding to the first capacitance CFD of the floating diffusion FD11.

In the second reset signal read-out period, the first-conversion-gain reset read-out operation HCGRRD is performed. More specifically, a first read-out reset signal HCGRST (ADC), which is produced through conversion with the first conversion gain HCG corresponding to the first capacitance of the floating diffusion FD11, is read from the source follower transistor SF11-Tr and subject to a predetermined operation.

The second reset signal read-out period is followed by a first transfer period, in which the control signal TG is switched to the high level to keep the transfer transistor TG11-Tr in the conduction state, so that the charges stored in the photodiode PD11 are transferred to the floating diffusion FD11. After the first transfer period, the control signal TG is switched to the low level to switch the transfer transistor TG11-Tr into the non-conduction state.

The first transfer period is followed by a first signal read-out period, in which the first-conversion-gain signal read-out operation HCGSRD is performed. More specifically, a first read-out signal HCGSIG (ADC), which is produced through conversion with the first conversion gain HCG corresponding to the first capacitance of the floating diffusion FD11, is read from the source follower transistor SF11-Tr and subject to a predetermined operation.

The reset level HCGRSTADC and the signal level HCGSIGADC are held, or a CDS operation is performed based on the difference between the reset level and the signal level.

After the first conversion gain read-out operation HCGSRD, the control signal LG is switched from the low level to the high level, to place the first switching transistor LG11-Tr into the conduction state and to connect the first capacitor CS11 to the floating diffusion FD11. In this way, the charges in the floating diffusion FD11 and the charges in the first capacitor CS11 are combined, so that the gain of the floating diffusion FD11 is switched to the second conversion gain MCG corresponding to the second capacitance.

The first signal read-out period is followed by a second transfer period, in which the control signal TG is switched to the high level to keep the transfer transistor TG11-Tr in the conduction state, so that the charges stored in the photodiode PD11 are transferred to the floating diffusion FD11. After the second transfer period, the control signal TG is switched to the low level to switch the transfer transistor TG11-Tr into the non-conduction state. The first signal read-out period is followed by the second transfer period and then a second signal read-out period, in which the second-conversion-gain signal read-out operation MCGSRD is performed. More Specifically, a second read-out signal MCGSIG (ADC), which is produced through conversion with the second conversion gain MCG corresponding to the second capacitance of the floating diffusion FD11, is read from the source follower transistor SF11-Tr and subject to a predetermined operation.

The reset level MCGRSTADC and the signal level MCGSIGADC are held, or a CDS operation is performed based on the difference between the reset level MCGRSTADC and the signal level MCGSIGADC.

At this point, the read-out mode is switched from the dual-conversion-gain read-out mode to the LOFIC read-out mode. While the dual-conversion-gain read-out operation involves reading only the charges stored in the photodiode PD11 using the two gains, the LOFIC read-out operation also involves reading the charges overflowing into and stored in the second capacitor CS12 beyond the full well capacity of photodiode PD11.

After the second-conversion-gain read-out operation MCGSRD described above, the control signal SG is switched from the low level to the high level, to place the second switching transistor SG11-Tr into the conduction state and to connect the second capacitor CS12 to the floating diffusion FD11. In this way, the charges FDC in the floating diffusion FD11 and the charges in the first and second capacitors CS11 and CS12 are combined, so that the gain of the floating diffusion FD11 is switched to the third conversion gain LCG corresponding to the third capacitance.

The second signal read-out period is followed by a third signal read-out period, in which the third-conversion-gain signal read-out operation LCGSRD is performed. More specifically, a third read-out signal LCG(LOFIC)SIG (ADC), which is produced through conversion with the third conversion gain LCG corresponding to the third capacitance of the floating diffusion FD11, is read from the source follower transistor SF11-Tr (the part (B) in FIG. 4) and subject to a predetermined operation.

The third signal read-out period is followed by a second reset operation period, in which the control signal RST is switched to the high level to switch the reset transistor RST11-Tr into the conduction state. This results in resetting the floating diffusion FD11 and the first and second capacitors CS11 and CS12. After a predetermined period of time has elapsed since the control signal RST is switched to the high level, the control signal RST is switched to the low level to switch the reset transistor RST11-Tr into the non-conduction state. In this way, a third reset signal read-out period begins. At this point, the control signals LG and SG remain at the high level so that the first and second switching transistors LG11-Tr and SG11-Tr are in the conduction state. Accordingly, the charges in the floating diffusion FD11 and the charges in the first and second capacitors CS11 and CS12 are combined, so that the gain of the floating diffusion FD11 remains at the third conversion gain LCG corresponding to the third capacitance including the capacitance CFD of the floating diffusion FD11, the capacitance CS1 of the first capacitor CS11 and the capacitance CS2 of the second capacitor CS12.

In the third reset signal read-out period following the reset operation, the third-conversion-gain reset read-out operation LCGRRD is performed. More specifically, a third read-out reset signal LOFIC(LCG)RST (ADC), which is produced through conversion with the third conversion gain LCG corresponding to the third capacitance of the floating diffusion FD11, is read from the source follower transistor SF11-Tr (the parts (B) and (C) in FIG. 4) and subject to a predetermined operation.

The reset level LCGRSTADC and the signal level LCGSIGADC are held, or a CDS operation is performed based on the difference between the reset level LCGRSTADC and the signal level LCGSIGADC.

As described above, the solid-state imaging device 10 relating to the first embodiment resets the floating diffusion FD11 before reading the first read-out reset signal HCGRST, as shown in the view (A) in FIG. 5. Accordingly, the FD dark current in the floating diffusion FD11 is removed (no FD dark current). In addition, the solid-state imaging device 10 relating to the first embodiment resets the floating diffusion FD11 and the first capacitor CS11 before reading the second read-out reset signal MCGRST, as shown in the view (C) in FIG. 6. Accordingly, no FD/CS dark current is in the floating diffusion FD11 or the first capacitor CS11. Note that, however, the dark current in the second capacitor CS12 serving as the second capacitance element can not be removed since the second capacitor CS12 serving as the second capacitance element is a node for storing charges in an integration period.

As described above, the pixel 200 relating to the first embodiment has: the floating diffusion FD11 for holding the charges transferred thereto so that the charges can be read as a voltage signal; the photodiode PD11 for storing charges therein determined by the amount of the incident light in the exposure period PEXP; the transfer transistor TG11-Tr configured to remain in the non-conduction state during the exposure period PEXP and in the conduction state during the transfer period to transfer the charges stored in the photodiode PD11 to the floating diffusion FD11; and the reset transistor RST11-Tr for performing a reset operation of discharging the charges stored in the floating diffusion FD11. The pixel 200 further includes: the first capacitor CS11 configured to be connected to or disconnected from the floating diffusion FD11 depending on the conversion gain; the first switching transistor LG11-Tr configured to selectively connect the floating diffusion FD11 and the first capacitor CS11; the second capacitor CS12 for storing therein the overflow charges overflowing from the photodiode PD11; and the second switching transistor SG11-Tr to selectively connect the floating diffusion FD11 and the second capacitor CS12. The pixel 200 further includes: the overflow path OVFP for allowing the charges overflowing from the photodiode PD11 to overflow toward the region where the second capacitor CS12 is formed; the overflow gate element LO11-Tr formed on the overflow path OVFP, where the overflow gate element LO11-Tr is configured to control the conduction through the overflow path OVFP; and the source follower transistor SF11-Tr for amplifying the voltage signal produced by the floating diffusion FD11 through conversion and outputting the amplified voltage signal.

The pixel 200 relating to the first embodiment is configured to, under control of the reading part 70, change the capacitance of the floating diffusion FD11 between the first capacitance and the second capacitance to change the conversion gain of the floating diffusion FD11 between the first conversion gain (high conversion gain: HCG) corresponding to the first capacitance and the second conversion gain (middle conversion gain: MCG) corresponding to the second capacitance, by selectively connecting the floating diffusion FD11 to the first capacitor CS11 through the first switching transistor LG11-Tr. The pixel 200 is further configured to, under control of the reading part 70, change the capacitance of the floating diffusion FD11 to the third capacitance to change the conversion gain to the third conversion gain (low conversion gain: LCG) corresponding to the third capacitance, by connecting the floating diffusion FD11 to the second capacitor CS12 through the second switching transistor SG11-Tr.

As described above, the pixel 200 relating to the first embodiment can perform triple-conversion-gain read-out, which involves the first-conversion-gain mode read-out of reading the pixel signals with the first conversion gain (for example, high conversion gain: HCG) corresponding to the first capacitance, the second-conversion-gain mode read-out of reading the pixel signals with the second conversion gain (for example, the middle conversion gain: MCG) corresponding to the second capacitance (different from the first capacitance), and the third-conversion-gain mode reading of reading the pixel signal with the third conversion gain (for example, the low conversion gain: LCG) corresponding to the third capacitance. In this manner, the pixel 200 relating to the first embodiment can minimize the degradation in the SNR at the inter-mode conjunction point without requiring the dividing of the pixels. In other words, the first embodiment can reduce the degradation of the SNR at the conjunction point of signals produced with different conversion gains while avoiding being affected by the optical specifications.

Figure 8:
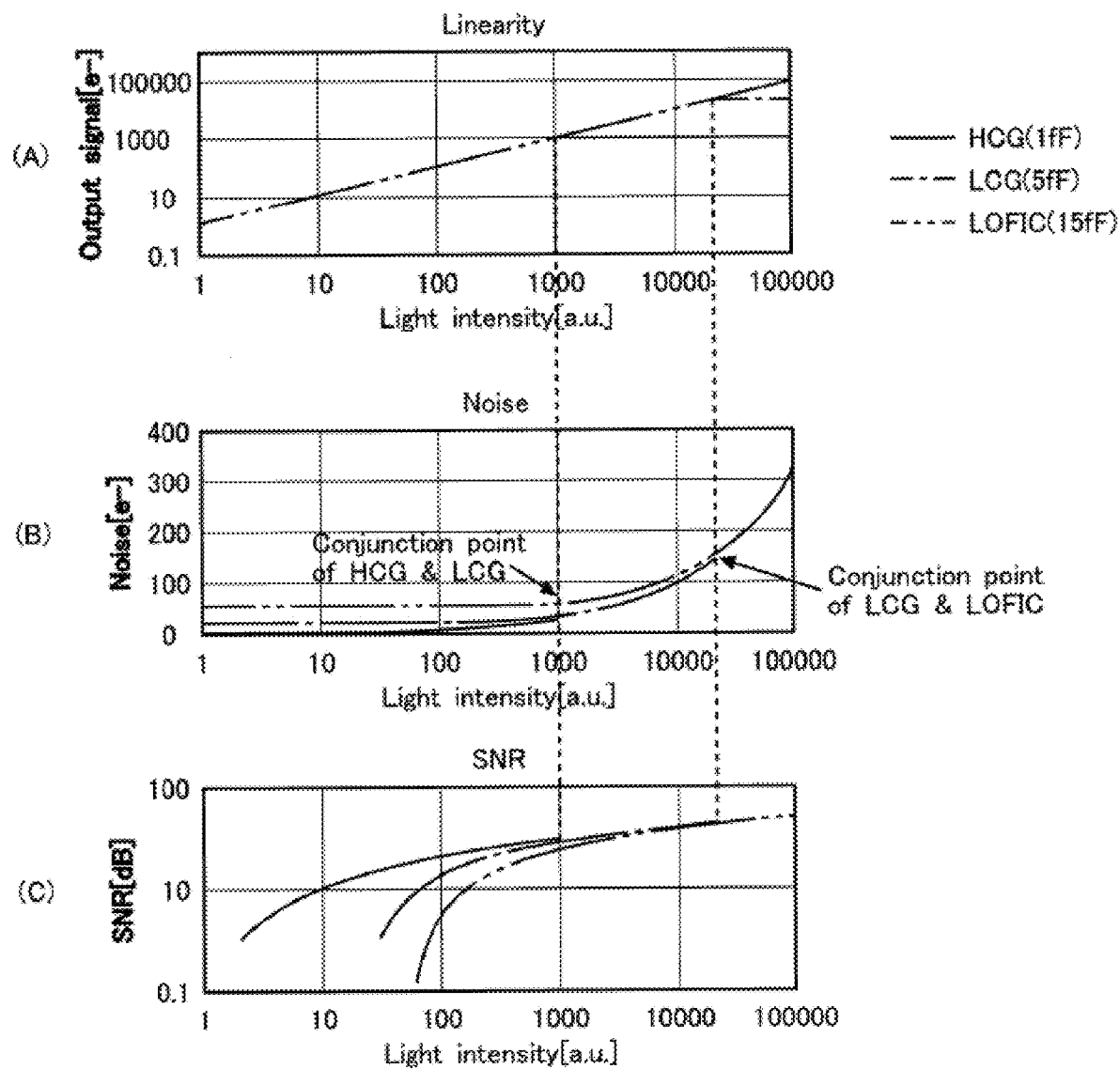
FIG. 8 includes graphs (A), (B) and (C) respectively showing the linearity, noise and SNR characteristics of a composite signal obtained by combining together the read-out signals read out in a triple-conversion-gain read-out mode in the solid-state imaging device relating to the first embodiment.

The first embodiment can also provide for a widened dynamic range by performing reading in a predetermined mode while the pixel achieves a small size. The first embodiment is capable of substantially achieving an increased dynamic range and a raised frame rate. Furthermore, according to the first embodiment, high-dynamic-range signals can be read with a linear response as shown in the graphs (A) to (C) in FIG. 8, and high-sensitivity/low-noise signals can be read with the HCG. The first embodiment can prevent the uneven full well capacities from being translated into uneven signals at the conjunction point of the pixels.

Second Embodiment

Figure 9:
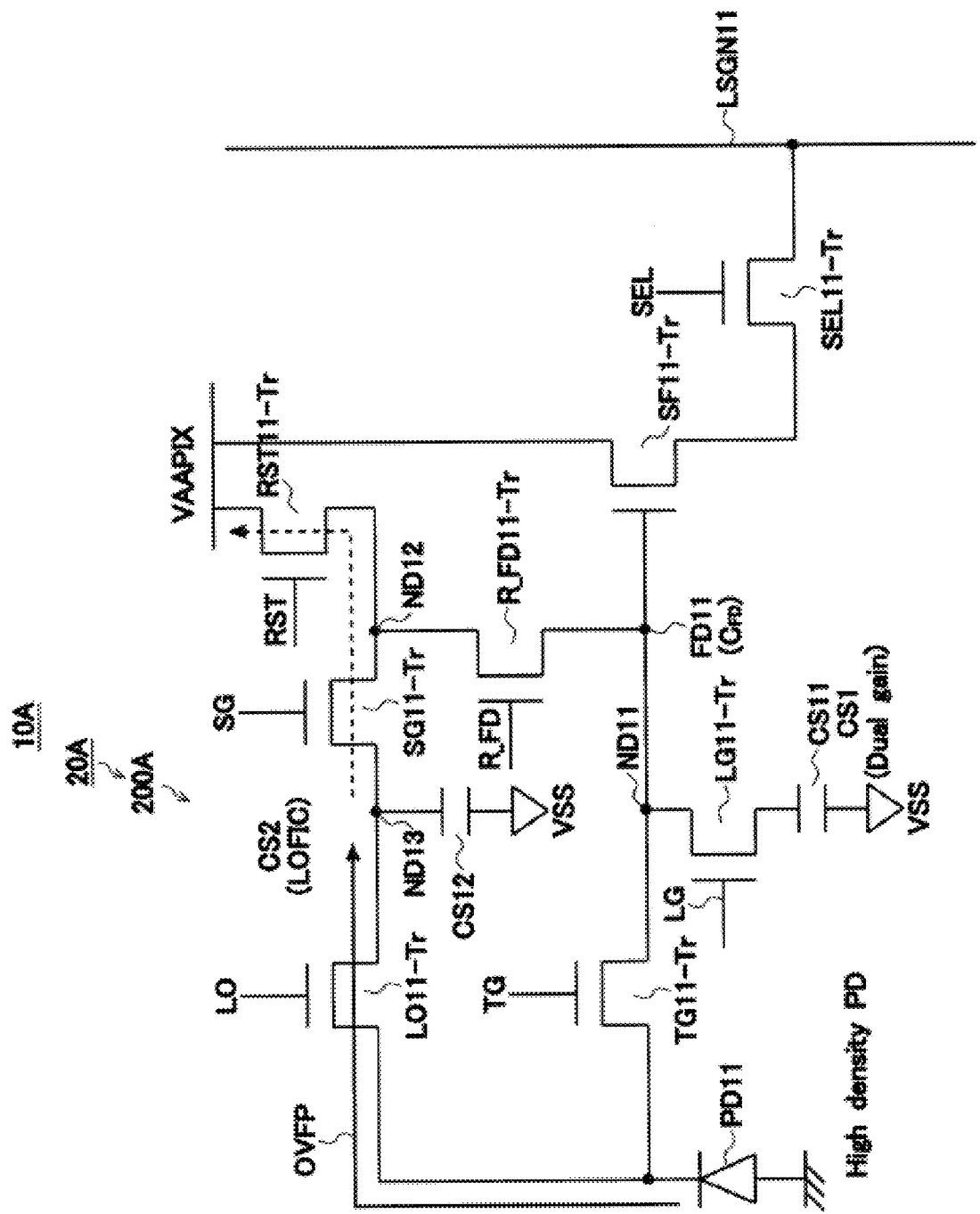
FIG. 9 is a circuit diagram showing an example configuration of a to-be-read pixel of a solid-state imaging device relating to a second embodiment of the present invention.

FIG. 9 is a circuit diagram showing an example configuration of a to-be-read pixel of a solid-state imaging device relating to a second embodiment of the present invention.

Figure 10:
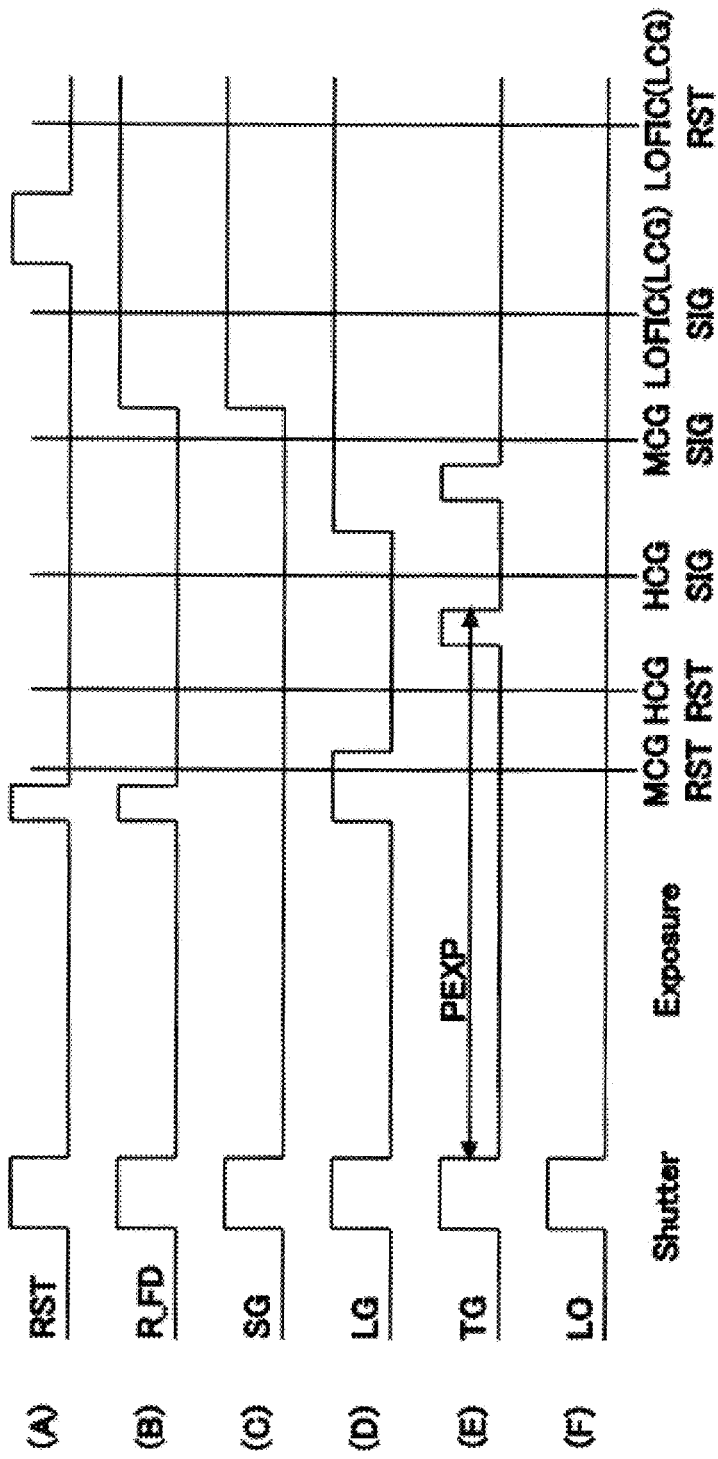
FIG. 10 is a timing chart to illustrate, as an example, a sequence of operations performed in a dual-conversion-gain read-out mode and an overflow read-out mode to read the pixels in the solid-state imaging device relating to the second embodiment of the present invention.
Figure 11:
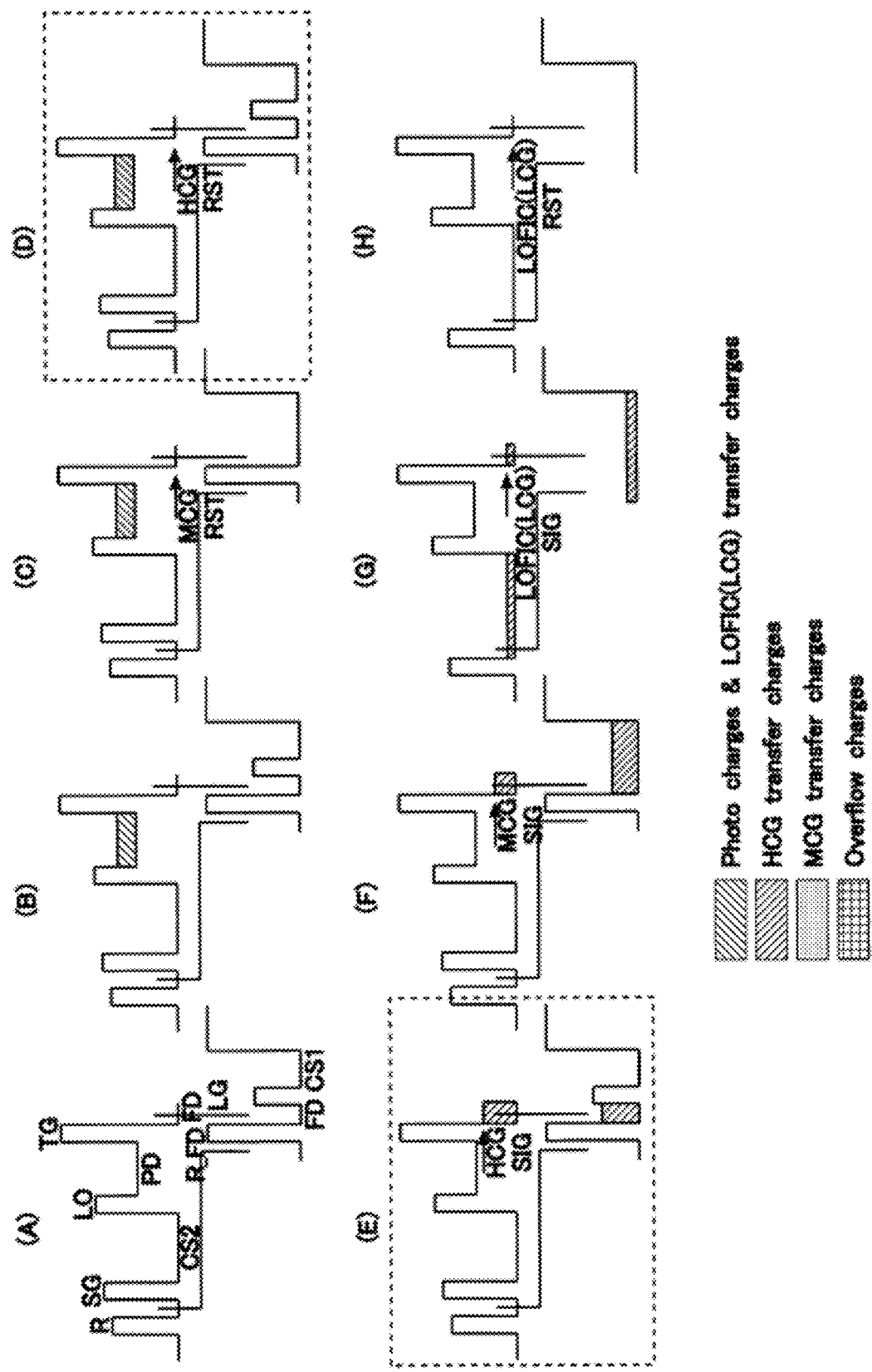
FIG. 11 includes views (A) to (H) illustrating a sequence of operations and potential transition to explain an operation performed in a dual-conversion-gain read-out mode and an overflow read-out mode on pixels of the solid-state imaging device relating to the second embodiment of the present invention in a low illuminance circumstance.
Figure 12:
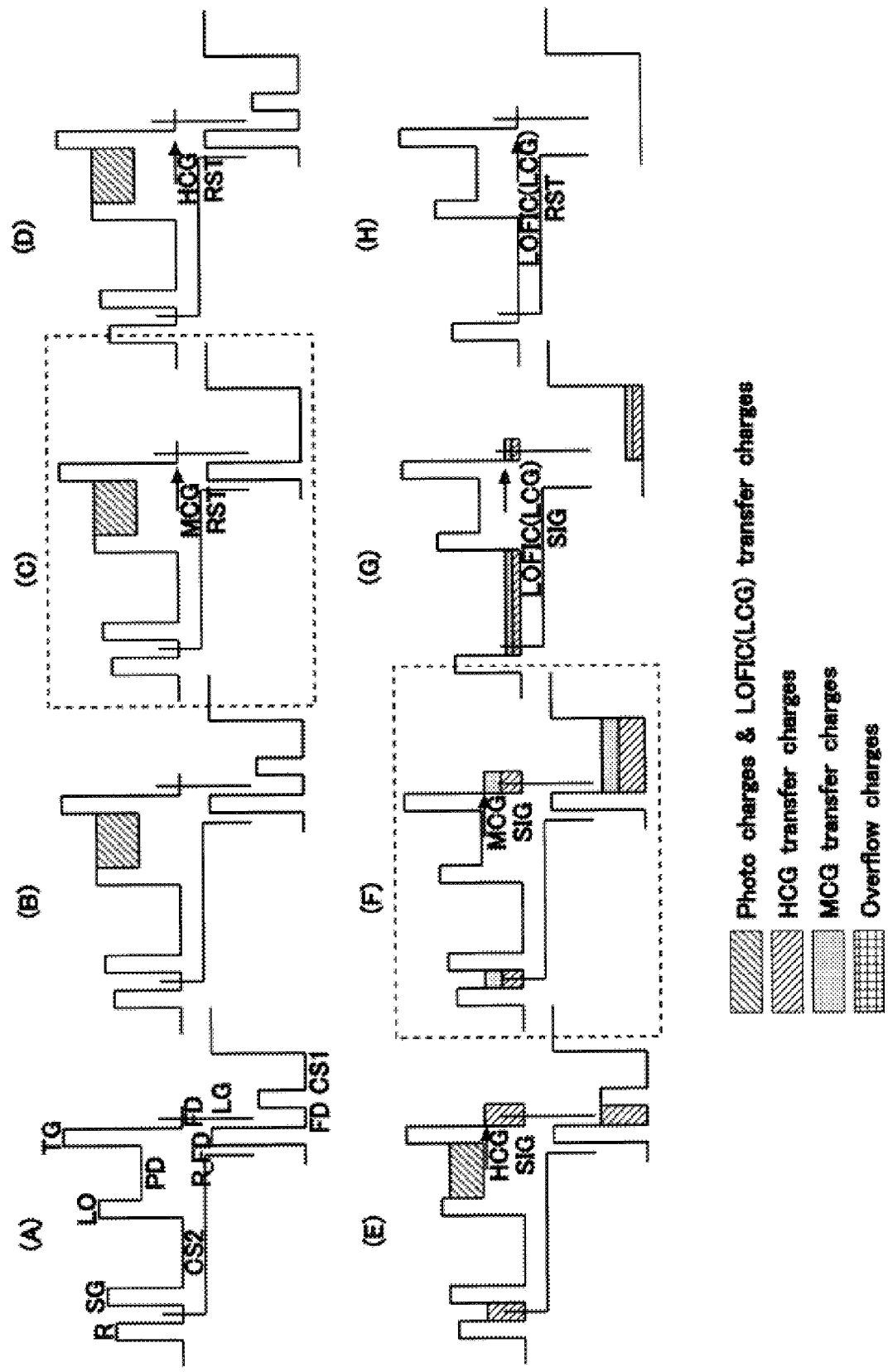
FIG. 12 includes views (A) to (H) illustrating a sequence of operations and potential transition to explain an operation performed in a dual-conversion-gain read-out mode and an overflow read-out mode on the pixels of the solid-state imaging device relating to the second embodiment of the present invention in a medium illuminance circumstance.
Figure 13:
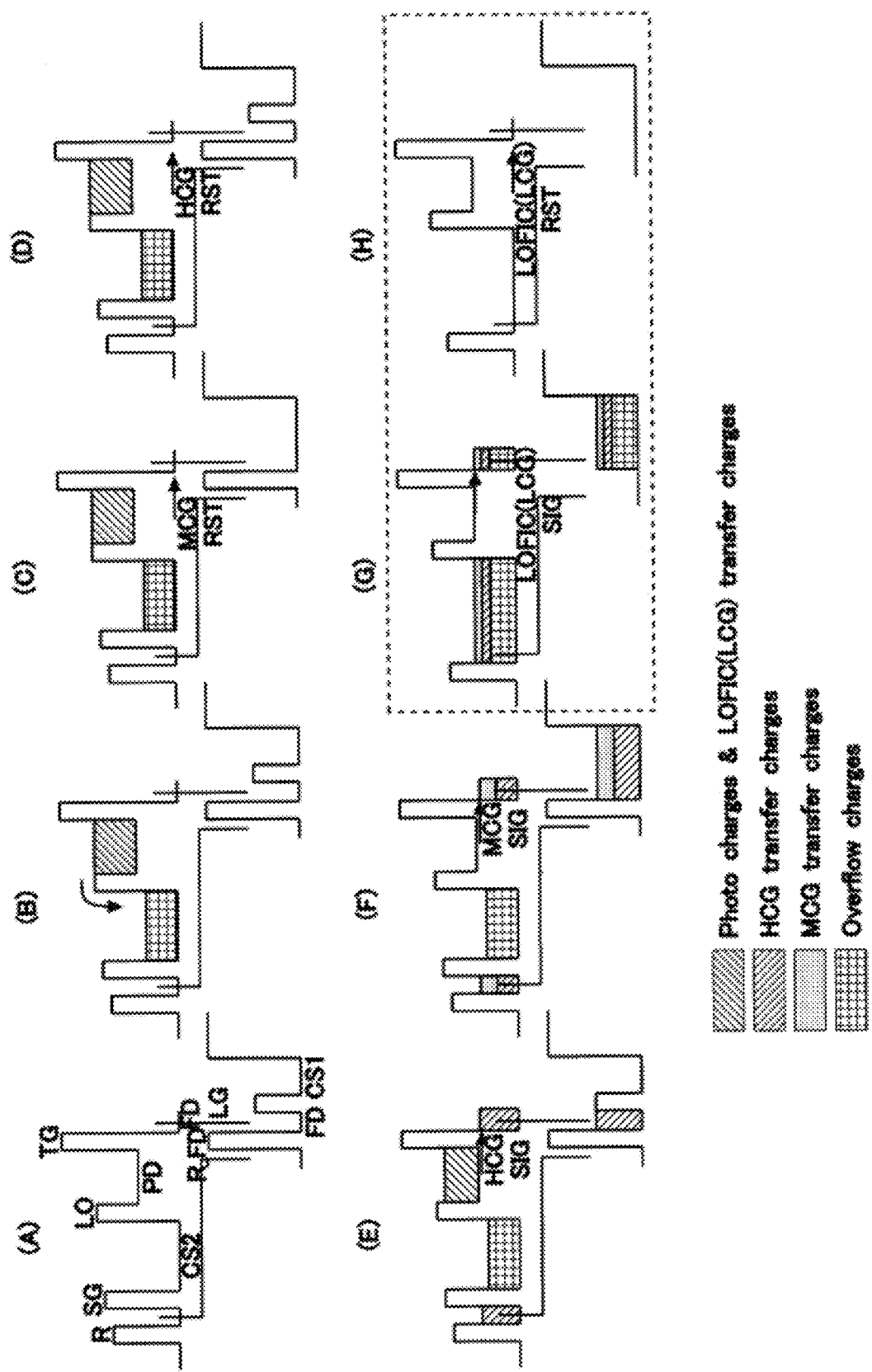
FIG. 13 includes views (A) to (H) illustrating a sequence of operations and potential transition to explain an operation performed in a dual-conversion-gain read-out mode and an overflow read-out mode on the pixels of the solid-state imaging device relating to the second embodiment of the present invention in a high illuminance circumstance.

FIG. 10 is a timing chart including parts (A) to (F) to illustrate, as an example, a sequence of operations performed in a dual-conversion-gain read-out mode and an overflow read-out mode to read the pixels in the solid-state imaging device relating to the second embodiment of the present invention. FIG. 11 includes views (A) to (H) illustrating a sequence of operations and potential transition to explain operations performed in the dual-conversion-gain read-out mode and the overflow read-out mode on the pixels of the solid-state imaging device relating to the second embodiment of the present invention in a low illuminance circumstance. FIG. 12 includes views (A) to (H) illustrating a sequence of operations and potential transition to explain operations performed in the dual-conversion-gain read-out mode and the overflow read-out mode on the pixels of the solid-state imaging device relating to the second embodiment of the present invention in a medium illuminance circumstance. FIG. 13 includes views (A) to (H) illustrating a sequence of operations and potential transition to explain operations performed in the dual-conversion-gain read-out mode and the overflow read-out mode on the pixels of the solid-state imaging device relating to the second embodiment of the present invention in a high illuminance circumstance.

In FIG. 10, the part (A) shows the control signal RST for the reset transistor RST11-Tr, the part (B) shows a control signal R_RD for a third switching transistor R_RD11-Tr, the part (C) shows the control signal SG for the second switching transistor SG11-Tr, the part (D) shows the control signal LG for the first switching transistor LG11-Tr, the part (E) shows the control signal TG for the transfer transistor TG11-Tr, and the part (F) shows the control signal LO for the overflow path transistor LO11-Tr.

A pixel 200A of a solid-state imaging device 10A relating to the second embodiment differs from the pixel 200 of the solid-state imaging device 10 relating to the above-described first embodiment in the following points.

The pixel 200A of the solid-state imaging device 10A relating to the second embodiment includes a third switching transistor R_RD11-Tr serving as a third connection element between (i) the floating diffusion FD11 and (ii) a connecting node (second node) ND12 between the reset transistor RST11-Tr and the second switching transistor SG11-Tr. The third switching transistor R_RD11-Tr is controlled by a control signal R_RD and selectively placed in one of the conduction state and the non-conduction state.

The third switching transistor R_RD11-Tr is switched to and remains at the high level in a first reset period or in the same period in which the control signal RST for the reset transistor RST11-Tr remains at the high level, to remain in the conduction state in this period, as shown in the parts (A) to (B) in FIG. 10. In addition, when the dual-conversion-gain read-out mode ends and the LOFIC read-out mode then starts, the third switching transistor R_RD11-Tr is switched to the high level at the same timing as when the control signal SG for the second switching transistor SG11-Tr is switched to the high level and remains in the conduction state, as shown in the parts (A) to (C) in FIG. 10.

Except for these features, the solid-state imaging device 10A relating to the second embodiment performs the sequence of read-out operations on the pixels in the dual-conversion-gain read-out mode and the overflow read-out mode in the same manner as the solid-state imaging device relating to the first embodiment. Therefore, the sequence of read-out operations is not described in detail here.

In other respects, the second embodiment is the same as the first embodiment described above. The second embodiment can not only produce the same effects as the above-described first embodiment but also produce the following effects.

According to the second embodiment, the floating diffusion FD11 and the second capacitor CS12 is allowed to be connected only in the period in which the third conversion gain LCG is selected. In this manner, if the charges in the second capacitor CS12 are not required, those unnecessary charges can be prevented from flowing into the floating diffusion FD11, thereby preventing mixing of the charges (generation of a false signal). Furthermore, a smaller number of adjacent transistors are required to determine the conversion gain of the floating diffusion FD11, and the conversion gain can be highly accurately determined.

Third Embodiment

Figure 14:
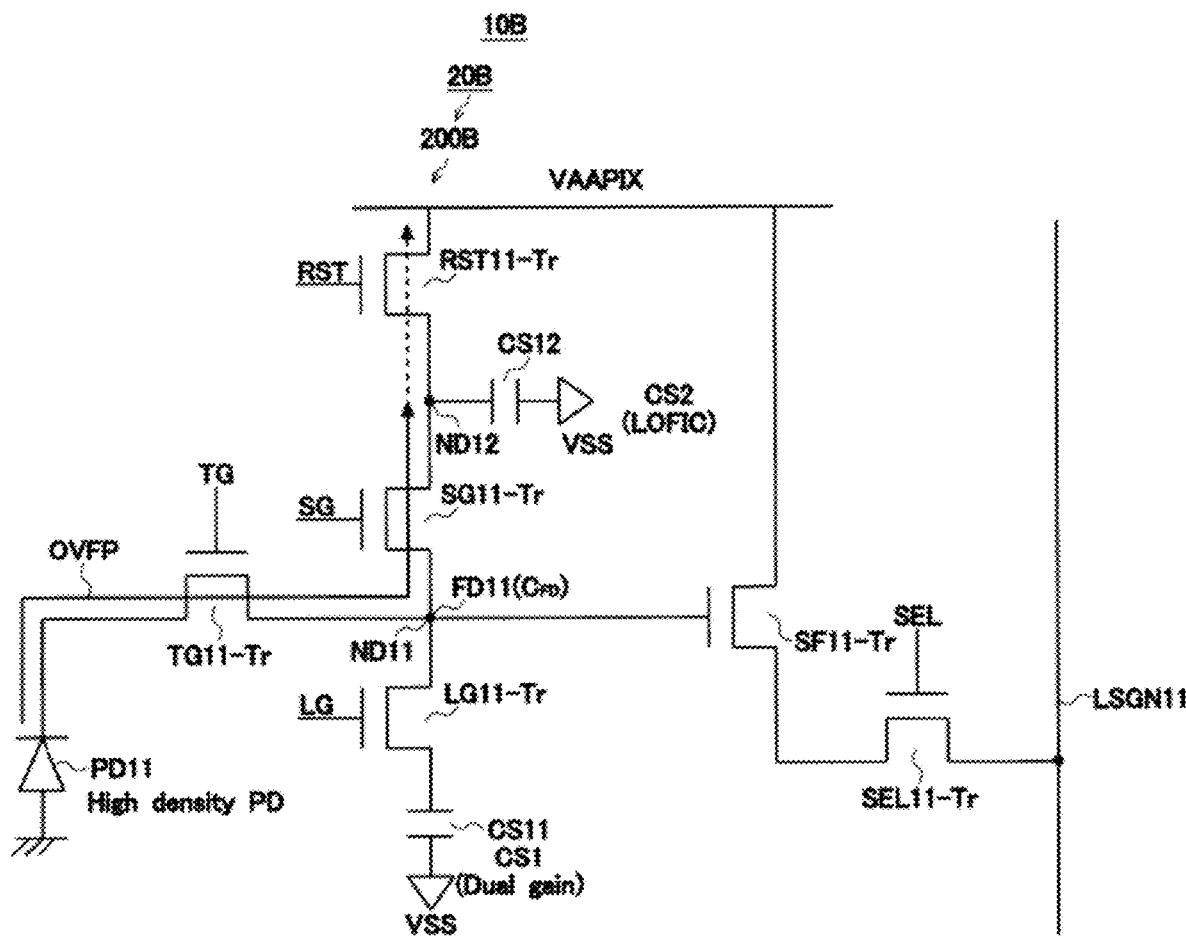
FIG. 14 is a circuit diagram showing an example configuration of a to-be-read pixel of a solid-state imaging device relating to a third embodiment of the present invention.

FIG. 14 is a circuit diagram showing an example configuration of a to-be-read pixel of a solid-state imaging device relating to a third embodiment of the present invention.

Figure 15:
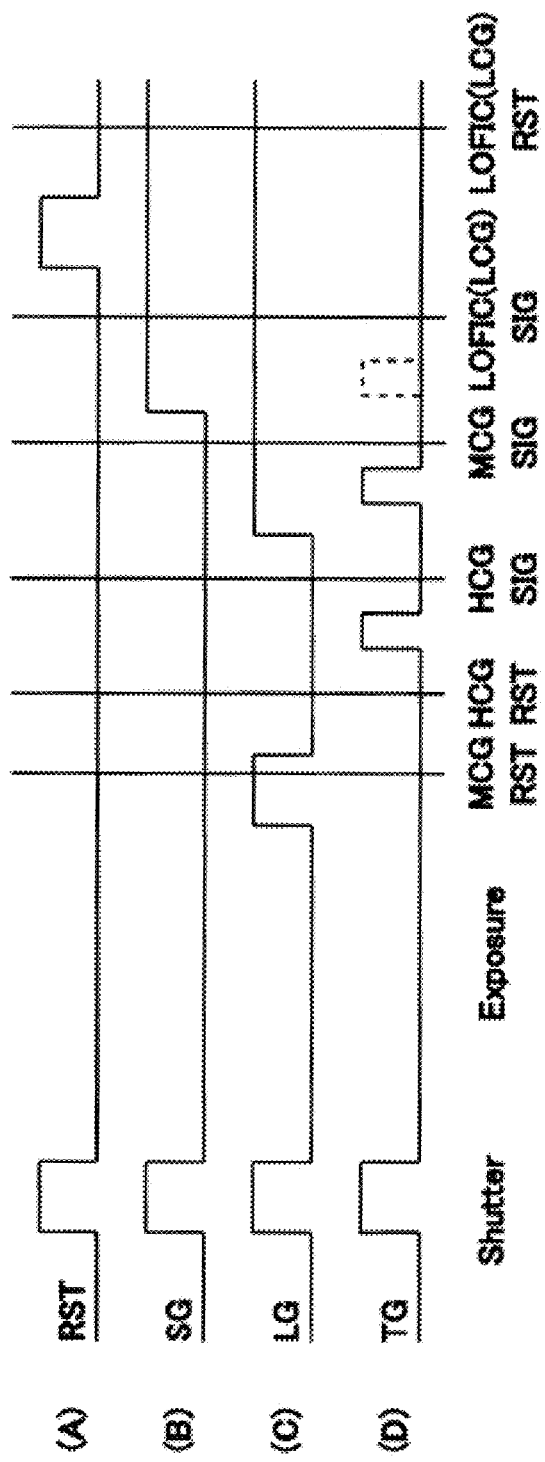
FIG. 15 is a timing chart to illustrate, as an example, a sequence of operations performed in a dual-conversion-gain read-out mode and an overflow read-out mode to read the pixels in the solid-state imaging device relating to the third embodiment of the present invention.
Figure 16:
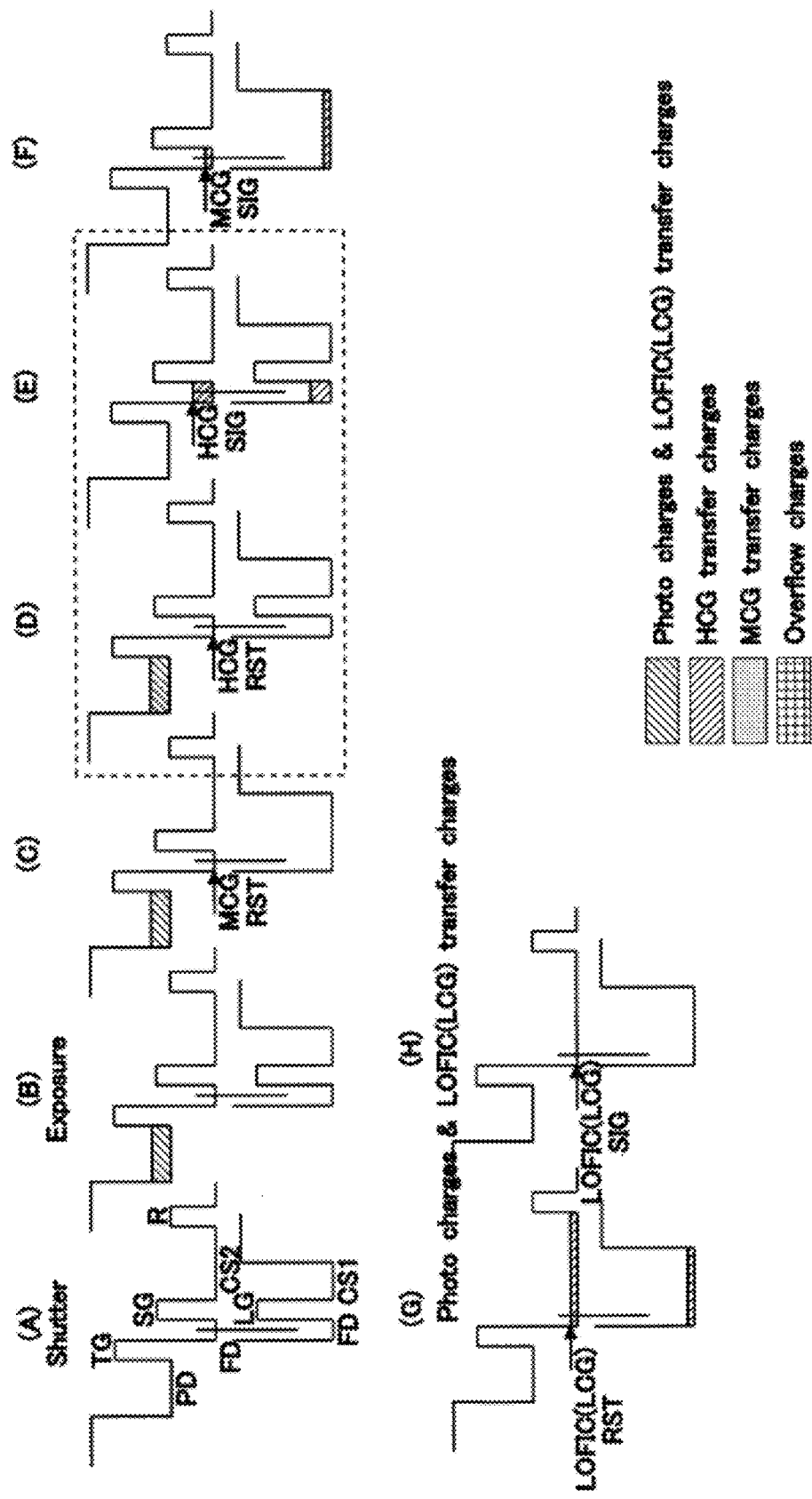
FIG. 16 includes views (A) to (H) illustrating a sequence of operations and potential transition to explain an operation performed in a dual-conversion-gain read-out mode and an overflow read-out mode on the pixels of the solid-state imaging device relating to the third embodiment of the present invention in a low illuminance circumstance.
Figure 17:
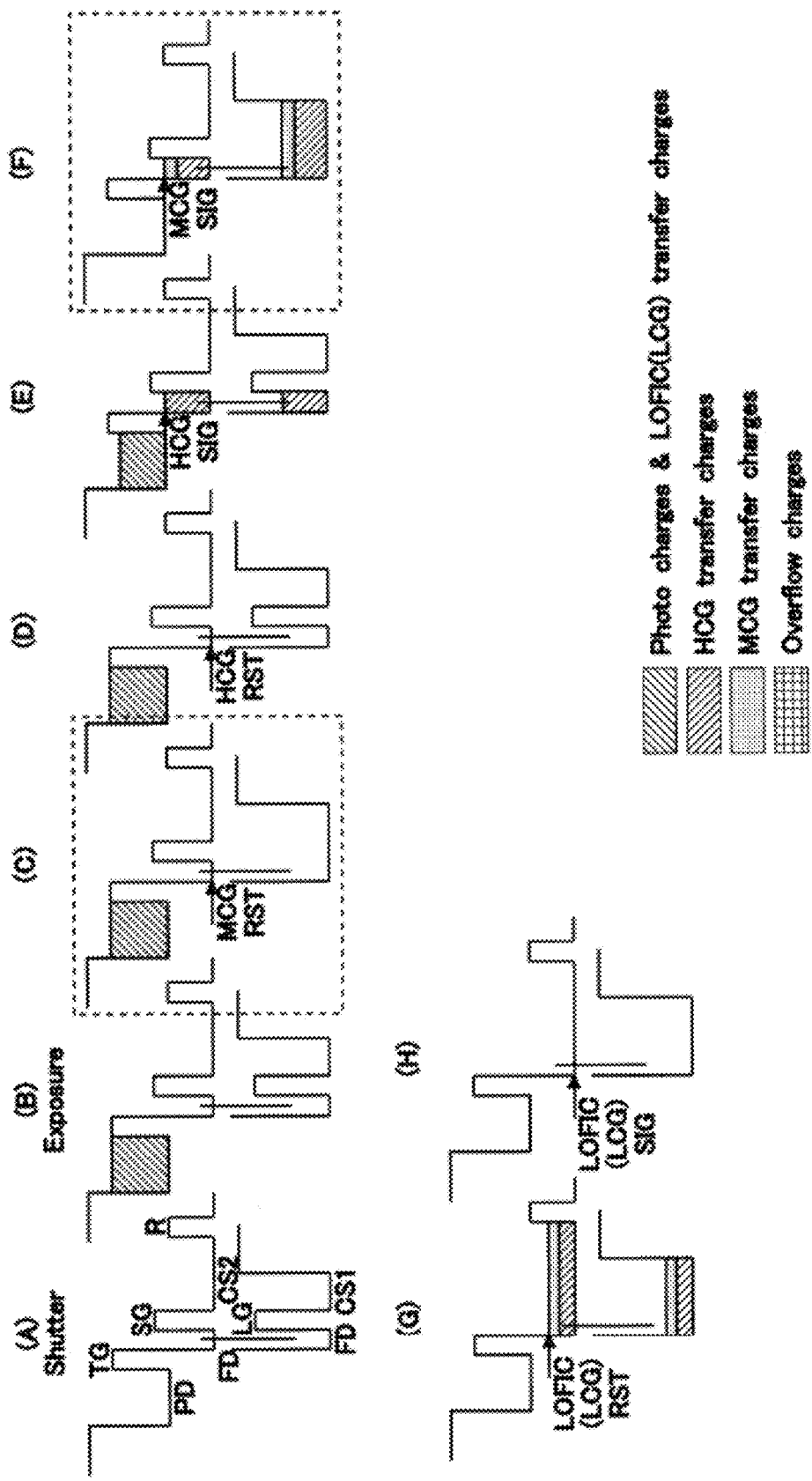
FIG. 17 includes views (A) to (H) illustrating a sequence of operations and potential transition to explain an operation performed in a dual-conversion-gain read-out mode and an overflow read-out mode on the pixels of the solid-state imaging device relating to the third embodiment of the present invention in a medium illuminance circumstance.
Figure 18:
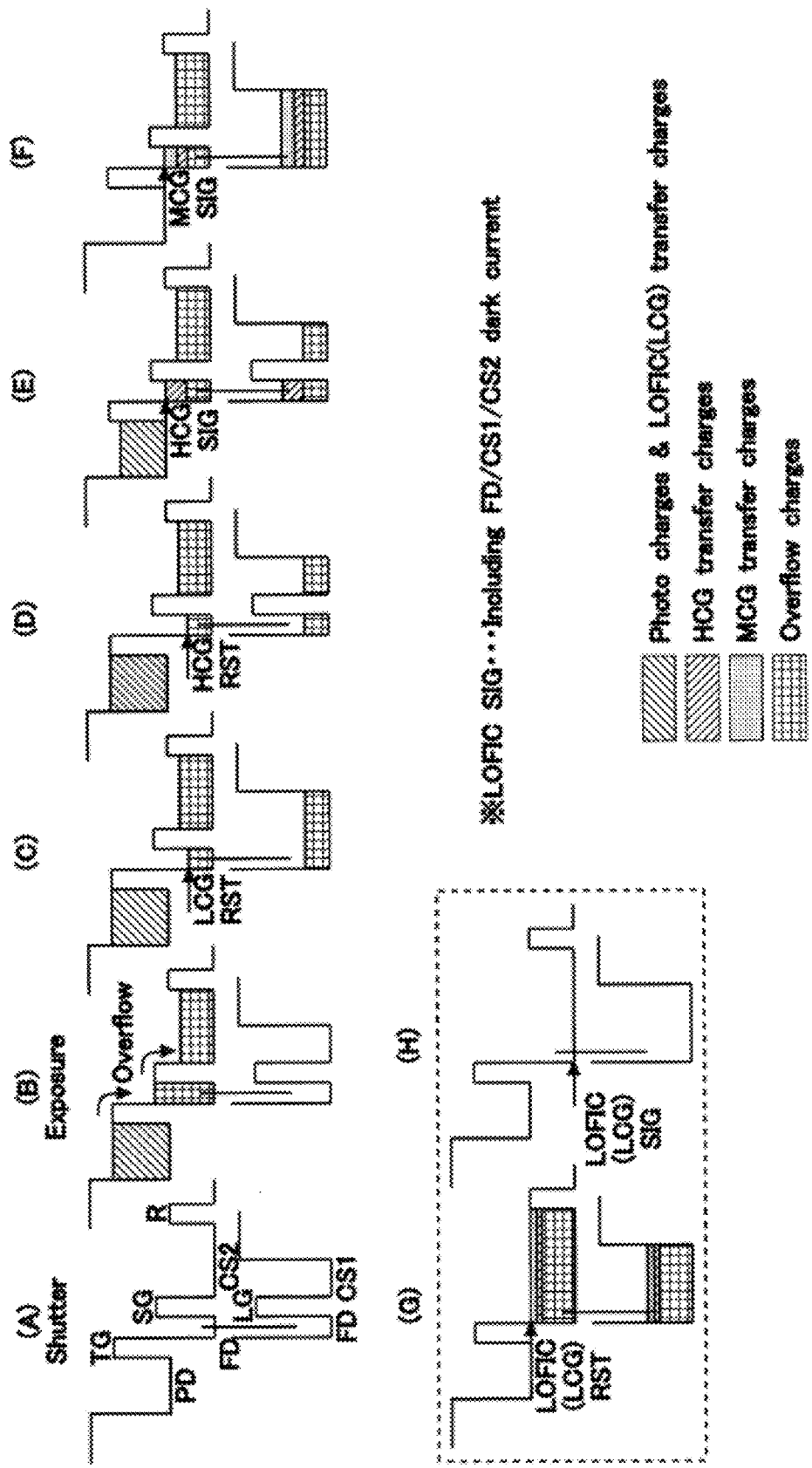
FIG. 18 includes views (A) to (H) illustrating a sequence of operations and potential transition to explain an operation performed in a dual-conversion-gain read-out mode and an overflow read-out mode on the pixels of the solid-state imaging device relating to the third embodiment of the present invention in a high illuminance circumstance.

FIG. 15 is a timing chart including parts (A) to (D) to illustrate, as an example, a sequence of operations performed in a dual-conversion-gain read-out mode and an overflow read-out mode to read the pixels in the solid-state imaging device relating to the third embodiment of the present invention. FIG. 16 includes views (A) to (H) illustrating a sequence of operations and potential transition to explain operations performed in the dual-conversion-gain read-out mode and the overflow read-out mode on the pixels of the solid-state imaging device relating to the third embodiment of the present invention in a low illuminance circumstance. FIG. 17 includes views (A) to (H) illustrating a sequence of operations and potential transition to explain operations performed in the dual-conversion-gain read-out mode and the overflow read-out mode on the pixels of the solid-state imaging device relating to the third embodiment of the present invention in a medium illuminance circumstance. FIG. 18 includes views (A) to (H) illustrating a sequence of operations and potential transition to explain operations performed in the dual-conversion-gain read-out mode and the overflow read-out mode on the pixels of the solid-state imaging device relating to the third embodiment of the present invention in a high illuminance circumstance.

In FIG. 15, the view (A) shows the control signal RST for the reset transistor RST11-Tr, the view (B) shows the control signal SG for the second switching transistor SG11-Tr, the view (C) shows the control signal LG for the first switching transistor LG11-Tr, and the view (D) shows the control signal TG for the transfer transistor TG11-Tr.

A pixel 200B of a solid-state imaging device 10B relating to the third embodiment differs from the pixel 200 of the solid-state imaging device 10 relating to the above-described first embodiment in the following points.

In the pixel 200B of the solid-state imaging device 10B relating to the third embodiment, the overflow path transistor LO11-Tr serving as the overflow gate element and the second switching transistor SG11-Tr serving as the second connecting element are formed by a single element. The third node ND13 and the second node ND12 are formed by a single element. The second switching transistor SG11-Tr serving as the second connection element is connected between the floating diffusion FD11 and the reset transistor RST11-Tr serving as the reset element, and the connection node between the reset transistor RST11-Tr and the second switching transistor SG11-Tr forms the second node ND12. The second capacitor CS12 serving as the second capacitance element is connected to the second node ND12, which is the connection node between the second switching transistor SG11-Tr serving as the second connection element and the reset transistor RST11-Tr serving as the reset element. The first switching transistor LG11-Tr serving as the first connection element and the first capacitor CS11 serving as the first capacitance element are connected in series between (i) the floating diffusion FD11 connected to the first node ND11 and (ii) the reference potential VSS.

As shown in the part (A) in FIG. 15, the solid-state imaging device 10B relating to the third embodiment does not reset the floating diffusion FD11 before the first read-out reset signal HCGRST is read. Accordingly, the FD dark current to be added to the charges in the floating diffusion FD11 is not completely removed (FD dark current is present). For this reason, some FD dark current is present in the read-out phase of the first read-out reset signal HCGRST, but can be removed through the CDS operation.

Except for these features, the solid-state imaging device 10B relating to the third embodiment basically performs the sequence of read-out operations on the pixels in the dual-conversion-gain read-out mode and the overflow read-out mode in the same manner as the solid-state imaging device relating to the first embodiment. Therefore, the sequence of read-out operations is not described in detail here.

In other respects, the third embodiment is the same as the first embodiment described above. The third embodiment can not only produce the same effects as the above-described first embodiment but also achieve simplified circuit configuration.

Fourth Embodiment

Figure 19:
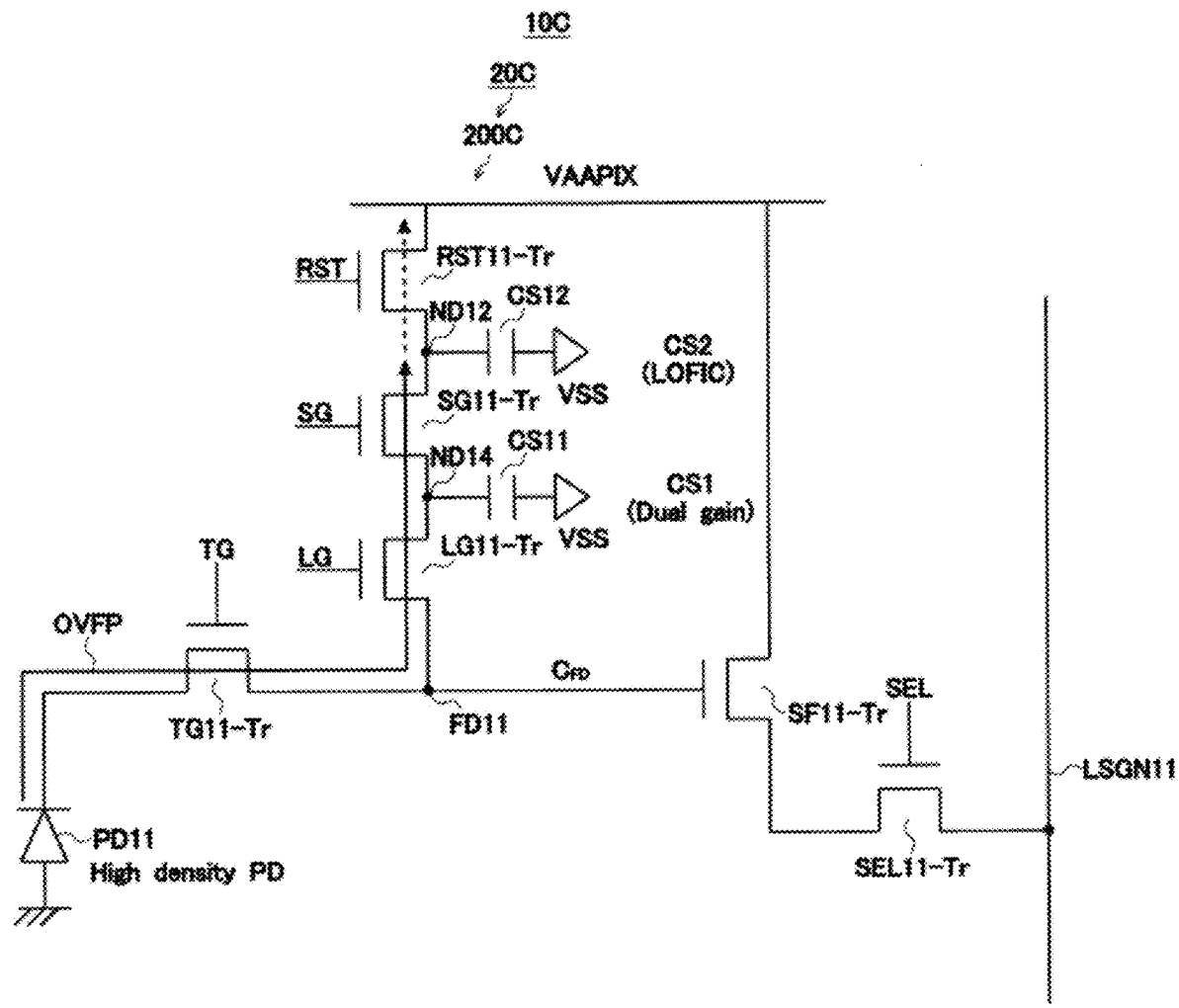
FIG. 19 is a circuit diagram showing an example configuration of a to-be-read pixel of a solid-state imaging device relating to a fourth embodiment of the present invention.

FIG. 19 is a circuit diagram showing an example configuration of a to-be-read pixel of a solid-state imaging device relating to a fourth embodiment of the present invention.

Figure 20:
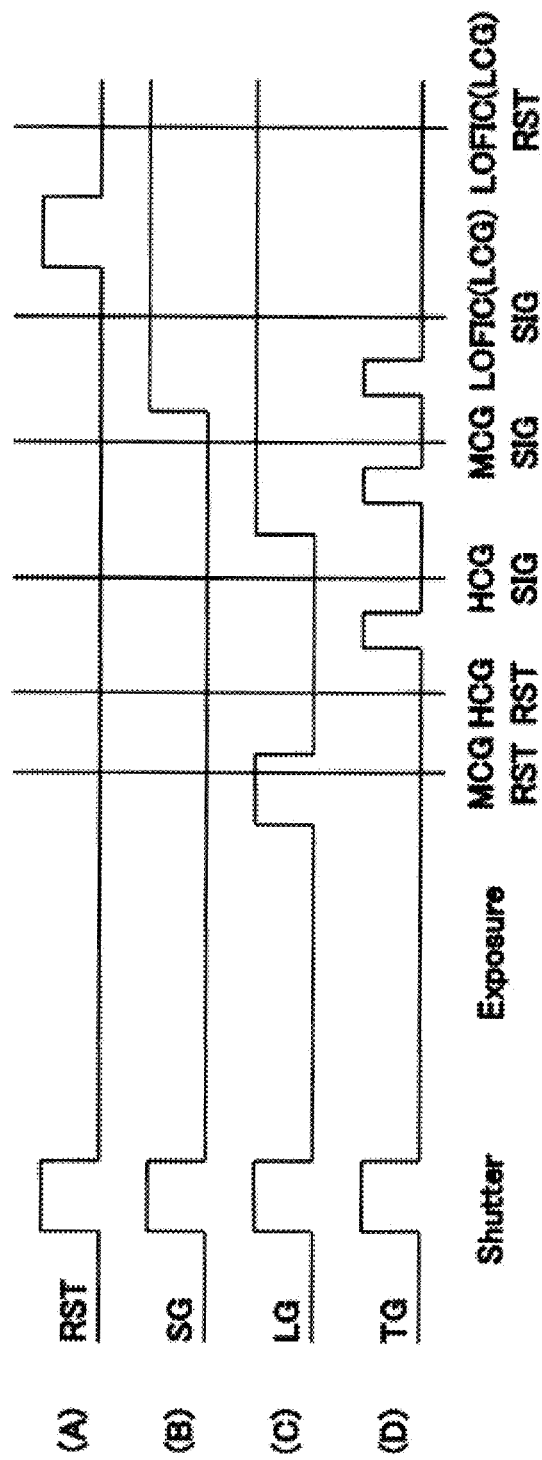
FIG. 20 is a timing chart to illustrate, as an example, a sequence of operations performed in a dual-conversion-gain read-out mode and an overflow read-out mode to read the pixels in the solid-state imaging device relating to the fourth embodiment of the present invention.
Figure 21:
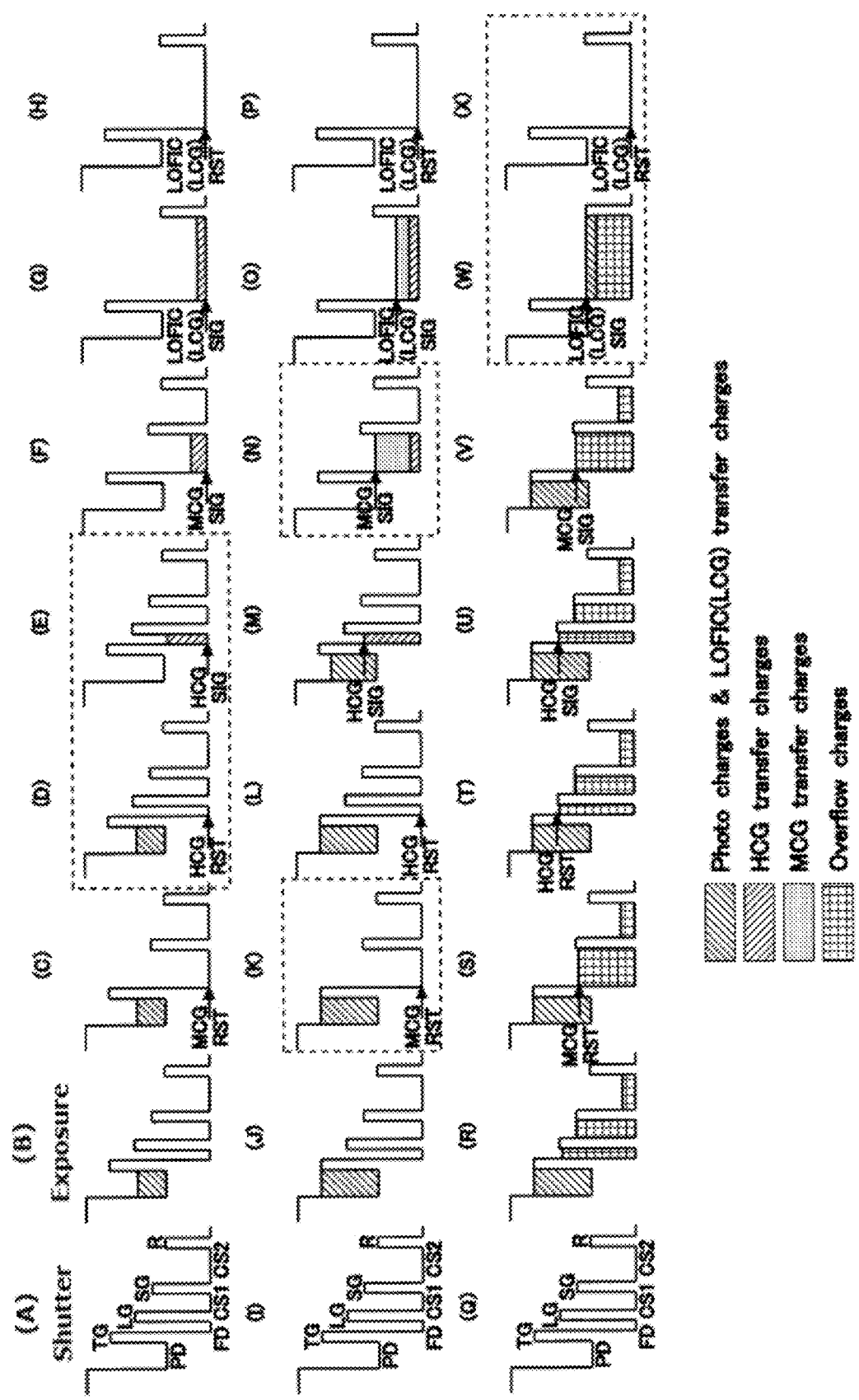
FIG. 21 includes views (A) to (X) illustrating a sequence of operations and potential transition to explain an operation performed in a dual-conversion-gain read-out mode and an overflow read-out mode on the pixels of the solid-state imaging device relating to the fourth embodiment of the present invention.

FIG. 20 is a timing chart including parts (A) to (D) to illustrate, as an example, a sequence of operations performed in a dual-conversion-gain read-out mode and an overflow read-out mode to read the pixels in the solid-state imaging device relating to the fourth embodiment of the present invention. FIG. 21 includes views (A) to (X) illustrating a sequence of operations and potential transition to explain operations performed in the dual-conversion-gain read-out mode and the overflow read-out mode on the pixels of the solid-state imaging device relating to the fourth embodiment of the present invention.

In FIG. 20, the part (A) shows the control signal RST for the reset transistor RST11-Tr, the part (B) shows the control signal SG for the second switching transistor SG11-Tr, the part (C) shows the control signal LG for the first switching transistor LG11-Tr, and the part (D) shows the control signal TG for the transfer transistor TG11-Tr.

A pixel 200C of a solid-state imaging device 10C relating to the fourth embodiment differs from the pixel 200B of the solid-state imaging device 10B relating to the above-described third embodiment in the following points.

In the pixel 200C of the solid-state imaging device 10C relating to the fourth embodiment, the first switching transistor LG11-Tr serving as the first connection element is connected in series between the floating diffusion FD11 and the second switching transistor SG11-Tr serving as the second connection element. In addition, a fourth node ND14 is formed by a connection node between the first switching transistor LG11-Tr serving as the first connection element and the second switching transistor SG11-Tr serving as the second connection element. The second switching transistor SG11-Tr serving as the second connection element is connected to the reset transistor RST11-Tr serving as the reset element, and the connection node therebetween forms the second node ND12. The first capacitor CS11 serving as the first capacitance element is connected to the fourth node ND14, which is the connection node between the first switching transistor LG11-Tr and the second switching transistor SG11-Tr. The second capacitor CS12 serving as the second capacitance element is connected to the second node ND12, which is the connection node between the second switching transistor SG11-Tr and the reset transistor RST11-Tr serving as the reset element.

As shown in the view (A) in FIG. 20, the solid-state imaging device 10C relating to the fourth embodiment does not reset the floating diffusion FD11 before the first read-out reset signal HCGRST is read. Accordingly, the FD dark current to be added to the charges in the floating diffusion FD11 is not completely removed (FD dark current is present). For this reason, some FD dark current is present in the read-out phase of the first read-out reset signal HCGRST, but can be removed through the CDS operation.

Except for these features, the solid-state imaging device 10C relating to the fourth embodiment basically performs the sequence of read-out operations on the pixels in the dual-conversion-gain read-out mode and the overflow read-out mode in the same manner as the solid-state imaging device relating to the first embodiment. Therefore, the sequence of read-out operations is not described in detail here.

In other respects, the fourth embodiment is the same as the third embodiment described above. The fourth embodiment can not only produce the same effects as the above-described third embodiment but also achieve further simplified circuit configuration.

Fifth Embodiment

Figure 22:
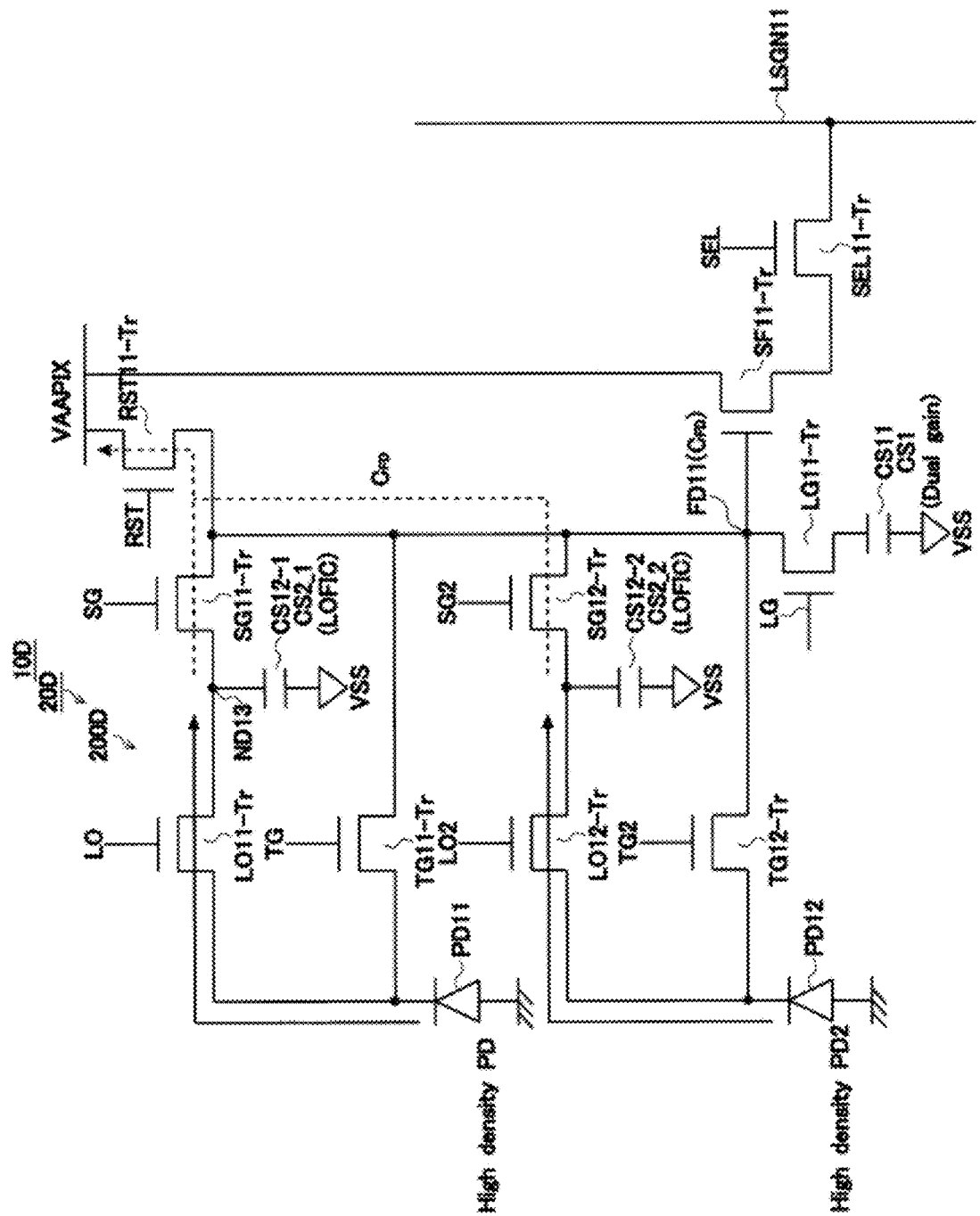
FIG. 22 is a circuit diagram showing an example configuration of a pixel of a solid-state imaging device relating to a fifth embodiment of the present invention.

FIG. 22 is a circuit diagram showing an example configuration of the pixel circuit of a solid-state imaging device 10D relating to a fifth embodiment of the present invention.

A pixel 200D of the solid-state imaging device 10D relating to the fifth embodiment differs from the pixel 200 of the solid-state imaging device 10 relating to the above-described first embodiment in the following points.

The solid-state imaging device 10D relating to the fifth embodiment has a pixel sharing configuration, where a plurality of (in the present embodiment, two) adjacent pixels PD11 and PD12 share one floating diffusion FD11. In the solid-state imaging device 10D relating to the fifth embodiment, the adjacent pixels 200-1 and 200-2 share a first switching transistor LG11-Tr serving as a first connection element and a first capacitor CS11 serving as a first capacitance element. According to the pixel sharing configuration of the present example, the adjacent pixels also share a source follower transistor SF11-Tr and a selection transistor SEL11-Tr.

In other respects, the fifth embodiment is the same as the first embodiment described above. The fifth embodiment can not only produce the same effects as the above-described first embodiment, but also achieve a reduced pixel size and further simplified circuit configuration.

<Examples of Application to Electronic Apparatuses>

The solid-state imaging devices 10, 10A, 10B, 10C and 10D described above can be applied, as an imaging device, to electronic apparatuses such as digital cameras, video cameras, mobile terminals, surveillance cameras, and medical endoscope cameras.

Figure 23:
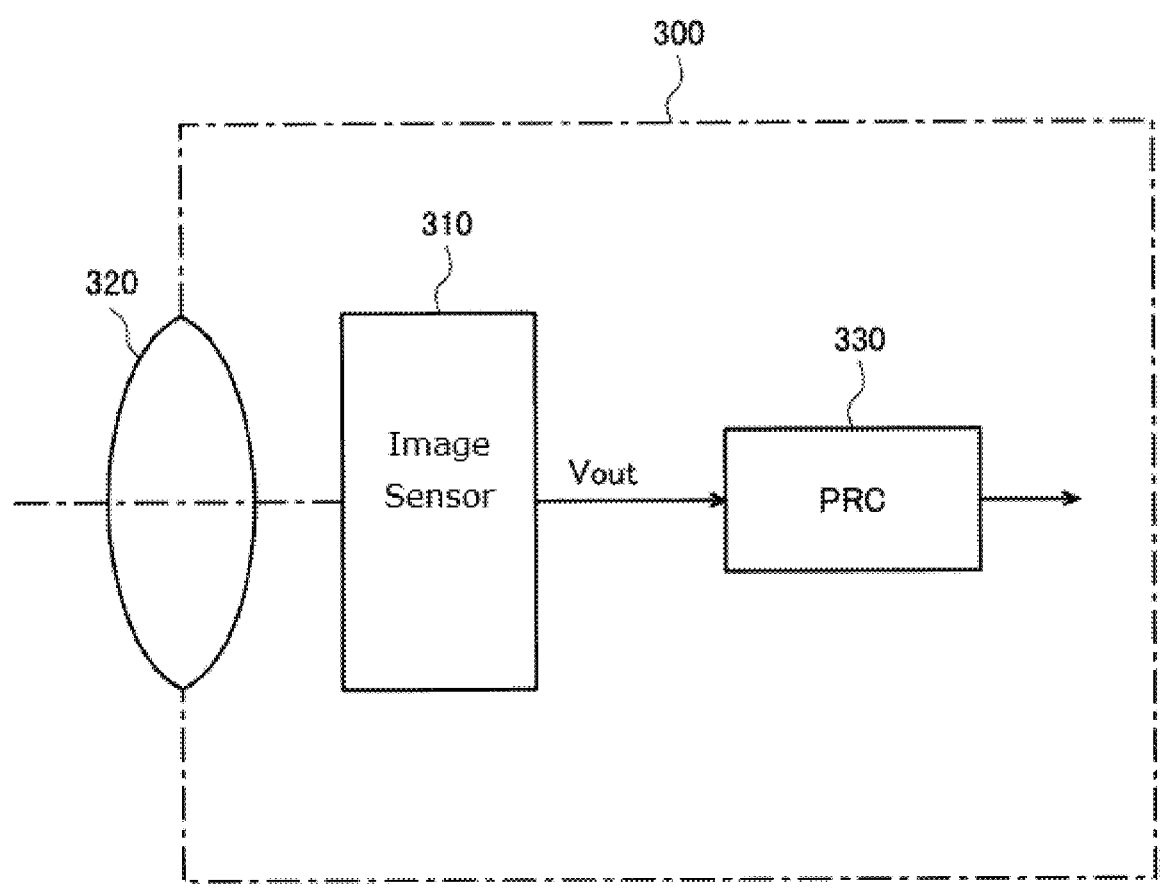
FIG. 23 shows an example configuration of an electronic apparatus to which the solid-state imaging devices relating to the embodiments of the present invention can be applied.

FIG. 23 shows an example of the configuration of an electronic apparatus including a camera system to which the solid-state imaging devices relating to the embodiments of the present invention are applied.

As shown in FIG. 23, an electronic apparatus 300 includes a CMOS image sensor 310 that can be constituted by the solid-state imaging devices 10, 10A, 10B, 10C and 10D relating to the embodiments of the present invention. The electronic apparatus 300 further includes an optical system (such as a lens) 420 for redirecting the incident light to the pixel region of the CMOS image sensor 310 (to form a subject image). The electronic apparatus 300 includes a signal processing circuit (PRC) 330 for processing the output signals from the CMOS image sensor 310.

The signal processing circuit 330 performs predetermined signal processing on the output signals from the CMOS image sensor 310. The image signals resulting from the processing in the signal processing circuit 330 can be handled in various manners. For example, the image signals can be displayed as a video image on a monitor having a liquid crystal display, printed by a printer, or recorded directly on a storage medium such as a memory card.

As described above, a high-performance, compact, and low-cost camera system can be provided that includes the solid-state imaging device 10, 10A, 10B, 10C, 10D as the CMOS image sensor 310. Accordingly, the embodiments of the present invention can provide for electronic apparatuses such as surveillance cameras and medical endoscope cameras, which are used for applications where the cameras are installed under restricted conditions from various perspectives such as the installation size, the number of connectable cables, the length of cables and the installation height.

LIST OF REFERENCE NUMBERS 10, 10A, 10B, 10C, 10D . . . solid-state imaging device, 20 . . . pixel part, 200, 200A to 200D, 200-1, 200-2 . . . pixel, PD11 photodiode, FD11 . . . floating diffusion, TG11-Tr . . . transfer transistor, RST11-Tr . . . reset transistor, SF11-Tr . . . source follower transistor, LG11-Tr . . . first switching transistor, SG11-Tr . . . second switching transistor, CS11 . . . first capacitor, CS12 . . . second capacitor, LO11-Tr . . . overflow path transistor, 300 . . . electronic apparatus, 310 . . . CMOS image sensor, 320 . . . optical system, 330 . . . signal processing circuit (PRC).

What is claimed is:

1. A solid-state imaging device comprising:
a pixel configured to perform photoelectric conversion, the pixel being configured to produce readable signals corresponding to at least three conversion gains,
wherein the pixel has:
a floating diffusion configured to hold charges transferred thereto so that the charges are read out as a voltage signal, the floating diffusion being configured to convert the charges into voltage determined by a capacitance;
a photoelectric conversion element configured to store therein, in an exposure period, charges corresponding to an amount of incident light;
a transfer element configured to remain in a non-conduction state during the exposure period and to remain in a conduction state during a transfer period to transfer to the floating diffusion the charges stored in the photoelectric conversion element;
a reset element configured to perform a reset operation of discharging the charges stored at least in the floating diffusion;
a first capacitance element configured to be connected to or disconnected from the floating diffusion according to a conversion gain;
a first connection element configured to selectively connect together the floating diffusion and the first capacitance element;
a second capacitance element configured to store overflow charges overflowing from the photoelectric conversion element;
a second connection element configured to selectively connect together the floating diffusion and the second capacitance element;
an overflow path configured to allow charges overflowing from the photoelectric conversion element to overflow toward a region where the second capacitance element is formed;
an overflow gate element formed on the overflow path to control conduction through the overflow path; and
a source follower element for amplifying a voltage signal produced by conversion performed by the floating diffusion and outputting the amplified voltage signal.

2. The solid-state imaging device of claim 1, wherein the pixel has a third connection element configured to selectively connect together the second connection element and the floating diffusion.

3. The solid-state imaging device of claim 1,
wherein the overflow gate element and the second connection element are formed by a single element,
wherein the second connection element is connected between the floating diffusion and the reset element,
wherein the second capacitance element is connected to a connection node between the second connection element and the reset element, and
wherein the first connection element and the first capacitance element are connected in series between the floating diffusion and a reference potential.

4. The solid-state imaging device of claim 1,
wherein the overflow gate element and the second connection element are formed by a single element,
wherein the first connection element and the second connection element are connected in series between the floating diffusion and the reset element,
wherein the first capacitance element is connected to a connection node between the first connection element and the second connection element, and
wherein the second capacitance element is connected to a connection node between the second connection element and the reset element.

5. The solid-state imaging device of claim 1, comprising
a pixel part having a plurality of the pixels arranged therein,
wherein the pixel part has a pixel sharing configuration where one floating diffusion is shared between at least two adjacent ones of the pixels.

6. The solid-state imaging device of claim 5, wherein, in the pixel part, at least two adjacent ones of the pixels share one reset element.

7. The solid-state imaging device of claim 5, wherein, in the pixel part, at least two adjacent ones of the pixels share one first capacitance element and one first connection element.

8. The solid-state imaging device of claim 1, comprising:
a pixel part having a plurality of the pixels arranged therein; and
a reading part configured to read a pixel signal from each of the pixels in the pixel part,
wherein the reading part is configured to:
by selectively connecting together the floating diffusion and the first capacitance element via the first connection element, change a capacitance of the floating diffusion between a first capacitance and a second capacitance to change a conversion gain between a first conversion gain corresponding to the first capacitance and a second conversion gain corresponding to the second capacitance; and
by connecting together the floating diffusion and the second capacitance element via the second connection element, change the capacitance of the floating diffusion to a third capacitance to change the conversion gain to a third conversion gain corresponding to the third capacitance.

9. The solid-state imaging device of claim 8,
wherein the reading part:
sequentially performs a second-conversion-gain reset read-out operation, a first-conversion-gain reset read-out operation, a first-conversion-gain signal read-out operation and a second-conversion-gain signal read-out operation in a dual-conversion-gain read-out mode; and sequentially performs a third-conversion-gain signal read-out operation and a third-conversion-gain reset read-out operation in an overflow read-out mode relating to overflow charges.

10. The solid-state imaging device of claim 9,
wherein, after keeping the reset element, the first connection element, the second connection element and the transfer element in a conduction state for a predetermined period of time to reset the photoelectric conversion element, the floating diffusion, the first capacitance element and the second capacitance element, and keeping the transfer element in a non-conduction state to start an exposure period,
the reading part:
sequentially performs the second-conversion-gain reset read-out operation, the first-conversion-gain reset read-out operation, the first-conversion-gain signal read-out operation and the second-conversion-gain signal read-out operation in the dual-conversion-gain read-out mode; and
subsequently, performs the third-conversion-gain signal read-out operation and the third-conversion-gain reset read-out operation sequentially in the overflow read-out mode relating to overflow charges.

11. The solid-state imaging device of claim 10, wherein the reading part, in the dual-conversion-gain read-out mode, causes the reset element to performs a reset operation on the floating diffusion, before performing the first-conversion-gain reset read-out operation.

12. The solid-state imaging device of claim 10,
wherein, after a predetermined period of time has elapsed since a start of the exposure period,
the reading part:
keeps the first connection element in a conduction state for a predetermined period of time to connect the first capacitance element to the floating diffusion, so that charges in the floating diffusion and charges in the first capacitance element are combined together to switch a gain of the floating diffusion to the second conversion gain corresponding to the second capacitance;
in a first reset read-out period, performs the second-conversion-gain reset read-out operation of reading from the source follower element a second read-out reset signal produced through conversion with the second conversion gain corresponding to the second capacitance of the floating diffusion and subjecting the second read-out reset signal to a predetermined operation;
keeps the first connection element to a non-conduction state to disconnect the first capacitance element from the floating diffusion, so that the charges in the floating diffusion are separated from the charges in the first capacitance element to switch the gain of the floating diffusion to the first conversion gain corresponding to the first capacitance;
in a second reset read-out period following the first reset read-out period, performs the first-conversion-gain reset read-out operation of reading from the source follower element a first read-out reset signal produced through conversion with the first conversion gain corresponding to the first capacitance of the floating diffusion and subjecting the first read-out reset signal to a predetermined operation;
in a first read-out period following a first transfer period following the second reset read-out period, performs the first-conversion-gain signal read-out operation of reading from the source follower element a first read-out signal produced through conversion with the first conversion gain corresponding to the first capacitance of the floating diffusion and subjecting the first read-out signal to a predetermined operation;
after the first-conversion-gain signal read-out operation, keeps the first connection element in a conduction state to connect the first capacitance element to the floating diffusion, so that the charges in the floating diffusion and the charges in the first capacitance element are combined together to switch the gain of the floating diffusion to the second conversion gain corresponding to the second capacitance;
in a second read-out period following a second transfer period following the first read-out period, performs the second-conversion-gain signal read-out operation of reading from the source follower element a second read-out signal produced through conversion with the second conversion gain corresponding to the second capacitance of the floating diffusion and subjecting the second read-out signal to a predetermined operation;
after the second-conversion-gain signal read-out operation, keeps the second connection element in a conduction state to connect the second capacitance element to the floating diffusion, so that the charges in the floating diffusion and the charges in the first and second capacitance elements are combined together to switch the gain of the floating diffusion to the third conversion gain corresponding to the third capacitance;
in a third read-out period following the second read-out period, performs the third-conversion-gain signal read-out operation of reading from the source follower element a third read-out signal produced through conversion with the third conversion gain corresponding to the third capacitance of the floating diffusion and subjecting the third read-out signal to a predetermined operation; and
after causing the reset element to reset the floating diffusion, performs the third-conversion-gain reset read-out operation of reading from the source follower element a third read-out reset signal produced through conversion with the third conversion gain corresponding to the third capacitance of the floating diffusion and subjecting the third read-out reset signal to a predetermined operation.

13. The solid-state imaging device of claim 11,
wherein, after a predetermined period of time has elapsed since a start of the exposure period,
the reading part:
keeps the first connection element in a conduction state for a predetermined period of time to connect the first capacitance element to the floating diffusion, so that charges in the floating diffusion and charges in the first capacitance element are combined together to switch a gain of the floating diffusion to the second conversion gain corresponding to the second capacitance;
after causing the reset element to reset the floating diffusion, in a first reset read-out period, performs the second-conversion-gain reset read-out operation of reading from the source follower element a second read-out reset signal produced through conversion with the second conversion gain corresponding to the second capacitance of the floating diffusion and subjecting the second read-out reset signal to a predetermined operation;
keeps the first connection element to a non-conduction state to disconnect the first capacitance element from the floating diffusion, so that the charges in the floating diffusion are separated from the charges in the first capacitance element to switch the gain of the floating diffusion to the first conversion gain corresponding to the first capacitance;

in a second reset read-out period following the first reset read-out period following the resetting, performs the first-conversion-gain reset read-out operation of reading from the source follower element a first read-out reset signal produced through conversion with the first conversion gain corresponding to the first capacitance of the floating diffusion and subjecting the first read-out reset signal to a predetermined operation;

in a first read-out period following a first transfer period following the second reset read-out period, performs the first-conversion-gain signal read-out operation of reading from the source follower element a first read-out signal produced through conversion with the first conversion gain corresponding to the first capacitance of the floating diffusion and subjecting the first read-out signal to a predetermined operation;

after the first-conversion-gain signal read-out operation, keeping the first connection element in a conduction state to connect the first capacitance element to the floating diffusion, so that the charges in the floating diffusion and the charges in the first capacitance element are combined together to switch the gain of the floating diffusion to the second conversion gain corresponding to the second capacitance;

in a second read-out period following a second transfer period following the first read-out period, performs the second-conversion-gain signal read-out operation of reading from the source follower element a second read-out signal produced through conversion with the second conversion gain corresponding to the second capacitance of the floating diffusion and subjecting the second read-out signal to a predetermined operation;

after the second-conversion-gain signal read-out operation, keeps the second connection element in a conduction state to connect the second capacitance element to the floating diffusion, so that the charges in the floating diffusion and the charges in the first and second capacitance elements are combined together to switch the gain of the floating diffusion to the third conversion gain corresponding to the third capacitance;

in a third read-out period following the second read-out period, performs the third-conversion-gain signal read-out operation of reading from the source follower element a third read-out signal produced through conversion with the third conversion gain corresponding to the third capacitance of the floating diffusion and subjecting the third read-out signal to a predetermined operation; and after causing the reset element to reset the floating diffusion, performs the third-conversion-gain reset read-out operation of reading from the source follower element a third read-out reset signal produced through conversion with the third conversion gain corresponding to the third capacitance of the floating diffusion and subjecting the third read-out reset signal to a predetermined operation.

14. The solid-state imaging device of claim 12, wherein the reading part performs the second-conversion-gain reset read-out operation and the first-conversion-gain reset read-out operation within the exposure period.

15. The solid-state imaging device of claim 13, wherein the reading part performs the second-conversion-gain reset read-out operation and the first-conversion-gain reset read-out operation within the exposure period.

16. A method for driving a solid-state imaging device, the solid-state imaging device including:

a pixel configured to perform photoelectric conversion, the pixel being configured to produce readable signals corresponding to at least three conversion gains, wherein the pixel has:

a floating diffusion configured to hold charges transferred thereto so that the charges are read out as a voltage signal, the floating diffusion being configured to convert the charges into voltage determined by a capacitance;

a photoelectric conversion element configured to store therein, in an exposure period, charges corresponding to an amount of incident light;

a transfer element configured to remain in a non-conduction state during the exposure period and to remain in a conduction state during a transfer period to transfer to the floating diffusion the charges stored in the photoelectric conversion element;

a reset element configured to perform a reset operation of discharging the charges stored at least in the floating diffusion;

a first capacitance element configured to be connected to or disconnected from the floating diffusion according to a conversion gain;

a first connection element configured to selectively connect together the floating diffusion and the first capacitance element;

a second capacitance element configured to store overflow charges overflowing from the photoelectric conversion element;

a second connection element configured to selectively connect together the floating diffusion and the second capacitance element;

an overflow path configured to allow charges overflowing from the photoelectric conversion element to overflow toward a region where the second capacitance element is formed;

an overflow gate element formed on the overflow path to control conduction through the overflow path;

and a source follower element for amplifying a voltage signal produced by conversion performed by the floating diffusion and outputting the amplified voltage signal, wherein, by selectively connecting together the floating diffusion and the first capacitance element via the first connection element, a capacitance of the floating diffusion is changed between a first capacitance and a second capacitance to change a conversion gain between a first conversion gain corresponding to the first capacitance and a second conversion gain corresponding to the second capacitance, and wherein, by connecting together the floating diffusion and the second capacitance element via the second connection element, the capacitance of the floating diffusion is changed to a third capacitance to change the conversion gain of the floating diffusion to a third conversion gain corresponding to the third capacitance.

17. An electronic apparatus comprising:
a solid-state imaging device; and
an optical system for forming a subject image on the solid-state imaging device,
wherein the solid-state imaging device includes:
a pixel configured to perform photoelectric conversion, the pixel being configured to produce readable signals corresponding to at least three conversion gains,
wherein the pixel has:
- a floating diffusion configured to hold charges transferred thereto so that the charges are read out as a voltage signal, the floating diffusion being configured to convert the charges into voltage determined by a capacitance;
- a photoelectric conversion element configured to store therein, in an exposure period, charges corresponding to an amount of incident light;
- a transfer element configured to remain in a non-conduction state during the exposure period and to remain in a conduction state during a transfer period to transfer to the floating diffusion the charges stored in the photoelectric conversion element;
- a reset element configured to perform a reset operation of discharging the charges stored at least in the floating diffusion;
- a first capacitance element configured to be connected to or disconnected from the floating diffusion according to a conversion gain;
- a first connection element configured to selectively connect together the floating diffusion and the first capacitance element;
- a second capacitance element configured to store overflow charges overflowing from the photoelectric conversion element;
- a second connection element configured to selectively connect together the floating diffusion and the second capacitance element;
- an overflow path configured to allow charges overflowing from the photoelectric conversion element to overflow toward a region where the second capacitance element is formed;
- an overflow gate element formed on the overflow path to control conduction through the overflow path; and
- a source follower element for amplifying a voltage signal produced by conversion performed by the floating diffusion and outputting the amplified voltage signal.

* * * * *